US010236655B2

(12) United States Patent
Kondo et al.

(10) Patent No.: US 10,236,655 B2
(45) Date of Patent: Mar. 19, 2019

(54) SOLID LASER AMPLIFICATION DEVICE

(71) Applicant: MITSUBISHI HEAVY INDUSTRIES, LTD., Tokyo (JP)

(72) Inventors: Yoshiyuki Kondo, Tokyo (JP); Yuichi Otani, Tokyo (JP); Yoshiteru Komuro, Tokyo (JP); Atsushi Kodama, Tokyo (JP); Koichi Hamamoto, Tokyo (JP); Hiroyuki Daigo, Tokyo (JP); Naoki Inoue, Tokyo (JP); Tomoya Morioka, Tokyo (JP); Masahiro Kato, Tokyo (JP); Shingo Nishikata, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 15/578,301

(22) PCT Filed: Jun. 8, 2016

(86) PCT No.: PCT/JP2016/067059
§ 371 (c)(1),
(2) Date: Nov. 30, 2017

(87) PCT Pub. No.: WO2017/064880
PCT Pub. Date: Apr. 20, 2017

(65) Prior Publication Data
US 2018/0145474 A1 May 24, 2018

(30) Foreign Application Priority Data
Oct. 16, 2015 (JP) .................. 2015-204803

(51) Int. Cl.
H01S 3/042 (2006.01)
H01S 3/063 (2006.01)
(Continued)

(52) U.S. Cl.
CPC ............ *H01S 3/042* (2013.01); *H01S 3/0407* (2013.01); *H01S 3/063* (2013.01); *H01S 3/0612* (2013.01);
(Continued)

(58) Field of Classification Search
CPC ....... H01S 3/042; H01S 3/063; H01S 3/10007
See application file for complete search history.

(56) References Cited

U.S. PATENT DOCUMENTS 3,633,126 A   1/1972  Martin
5,802,087 A   9/1998  Takaichi
(Continued)

FOREIGN PATENT DOCUMENTS

EP   2 312 706    4/2011
JP   48-15599     5/1973
(Continued)

OTHER PUBLICATIONS

International Search Report dated Aug. 23, 2016 in International (PCT) Application No. PCT/JP2016/067059, with English translation.
(Continued)

*Primary Examiner* — Dung Nguyen
(74) *Attorney, Agent, or Firm* — Wenderoth, Lind & Ponack, L.L.P.

(57) ABSTRACT

A solid laser amplification device having a laser medium that has a solid medium, into which a laser light enters and from which the laser light is emitted, and an amplification layer, provided on the surface of the medium, receives the laser light in the medium, and amplifies and reflects the light toward the exit; and a microchannel cooling part that has a plurality of cooling pipelines, into which a cooling solvent is conducted and which are arranged parallel to the surface of the amplification layer, and a cooling surface, at the outer (Continued)

periphery of the cooling pipelines and attached on the surface of the amplification layer, the microchannel cooling part cooling the amplification layer. The closer the position of the cooling pipeline to a position facing a section of the amplification layer that receives the laser light, the greater the cooling force exhibited by the cooling part.

6 Claims, 14 Drawing Sheets

(51) Int. Cl.
*H01S 3/10* (2006.01)
*H01S 3/06* (2006.01)
*H01S 3/16* (2006.01)
*H01S 3/23* (2006.01)
*H01S 3/00* (2006.01)
*H01S 3/02* (2006.01)
*H01S 3/04* (2006.01)

(52) U.S. Cl.
CPC .......... *H01S 3/10007* (2013.01); *H01S 3/005* (2013.01); *H01S 3/025* (2013.01); *H01S 3/0405* (2013.01); *H01S 3/0604* (2013.01); *H01S 3/0621* (2013.01); *H01S 3/1611* (2013.01); *H01S 3/1643* (2013.01); *H01S 3/1685* (2013.01); *H01S 3/2316* (2013.01)

(56) References Cited

U.S. PATENT DOCUMENTS

| | | | |
|---|---|---|---|
| 6,002,695 A | 12/1999 | Alfrey et al. | |
| 6,339,605 B1 | 1/2002 | Vetrovec | |
| 7,430,230 B2 | 9/2008 | Savich | |
| 8,929,413 B2 | 1/2015 | Aubry et al. | |
| 2002/0097769 A1 | 7/2002 | Vetrovec | |
| 2005/0189647 A1 | 9/2005 | Sung | |
| 2006/0227841 A1 | 10/2006 | Savich | |
| 2007/0297469 A1 | 12/2007 | Brown | |
| 2011/0176574 A1 | 7/2011 | Ikegawa et al. | |

FOREIGN PATENT DOCUMENTS

| | | | |
|---|---|---|---|
| JP | 8-191167 | | 7/1996 |
| JP | 9-181376 | | 7/1997 |
| JP | 2001-15844 | * | 1/2001 |
| JP | 2001-501776 | | 2/2001 |
| JP | 2008-532264 | | 8/2008 |
| JP | 5135207 | | 2/2013 |
| JP | 2014-22568 | * | 2/2014 |
| JP | 2014-504011 | | 2/2014 |

OTHER PUBLICATIONS

Written Opinion of the International Searching Authority dated Aug. 23, 2016 in International (PCT) Application No. PCT/JP2016/067059, with English translation.
Pop et al., "Thermal properties of graphene: fundamentals and applications", MRS Bull. 37, 1273 (2012).
Office Action dated May 2, 2018 in corresponding U.S. Appl. No. 15/574,190.
Extended European Search Report dated Aug. 27, 2018 in European Patent Application No. 16855135.6.
Extended European Search Report dated Sep. 6, 2018 in European Patent Application No. 16855134.9.
Final Office Action dated Oct. 16, 2018 in U.S. Appl. No. 15/574,190.

* cited by examiner

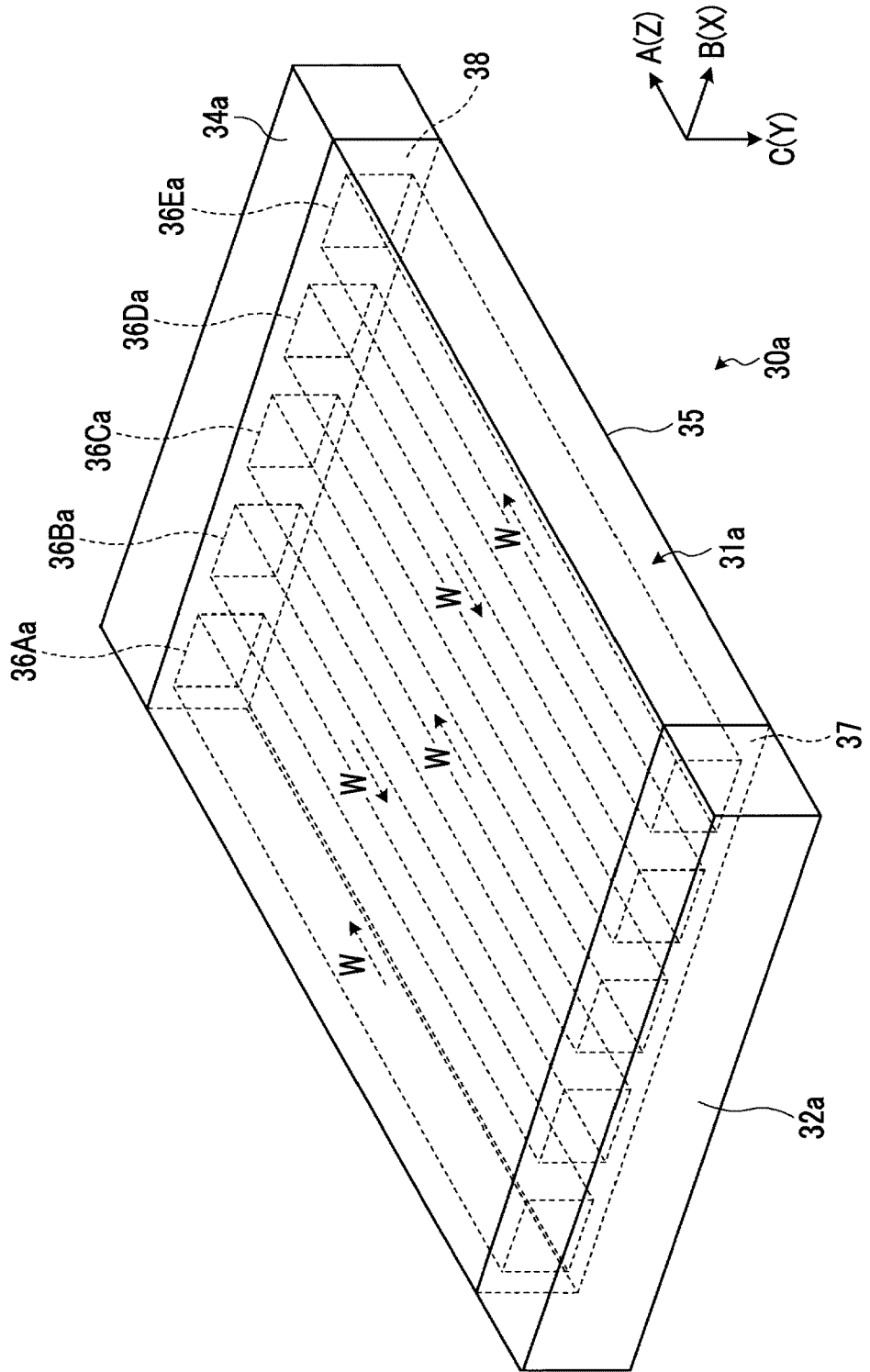

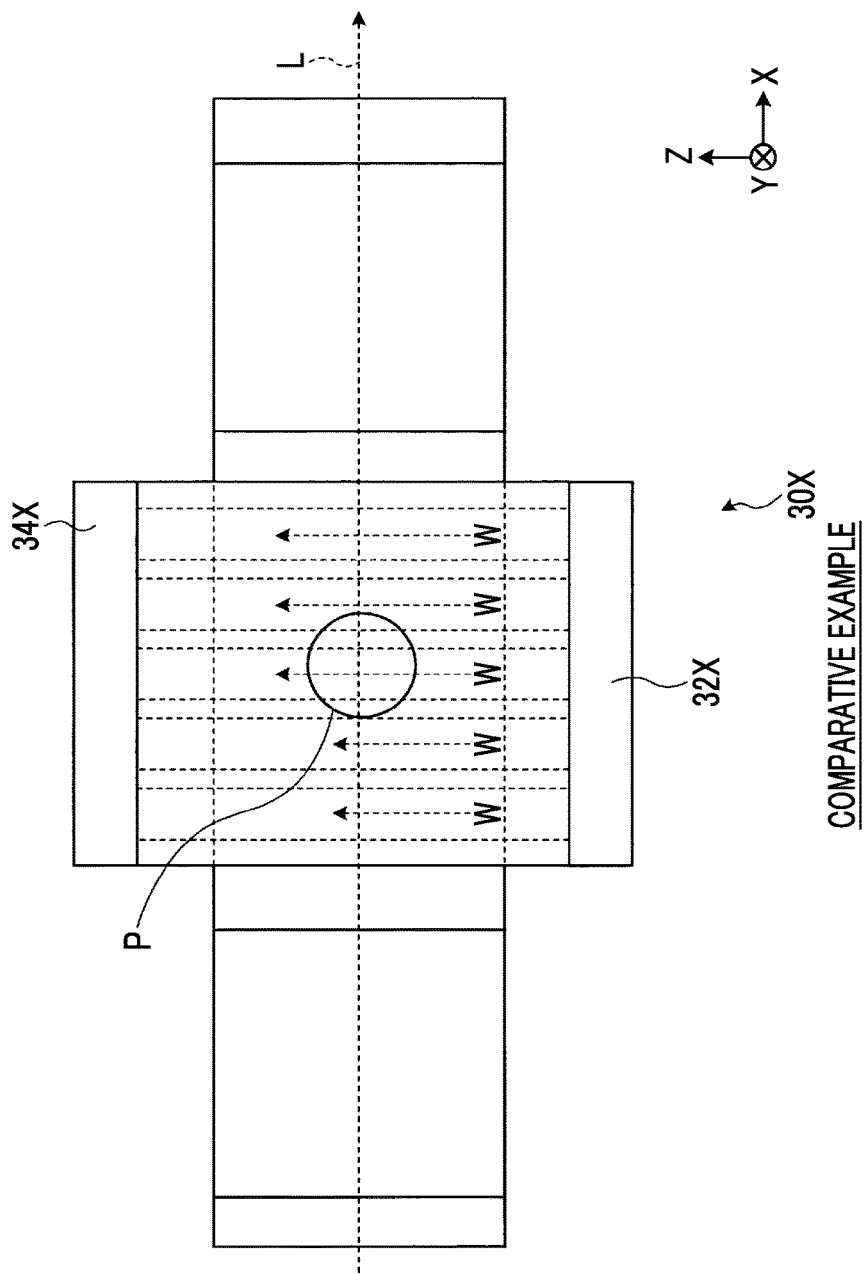

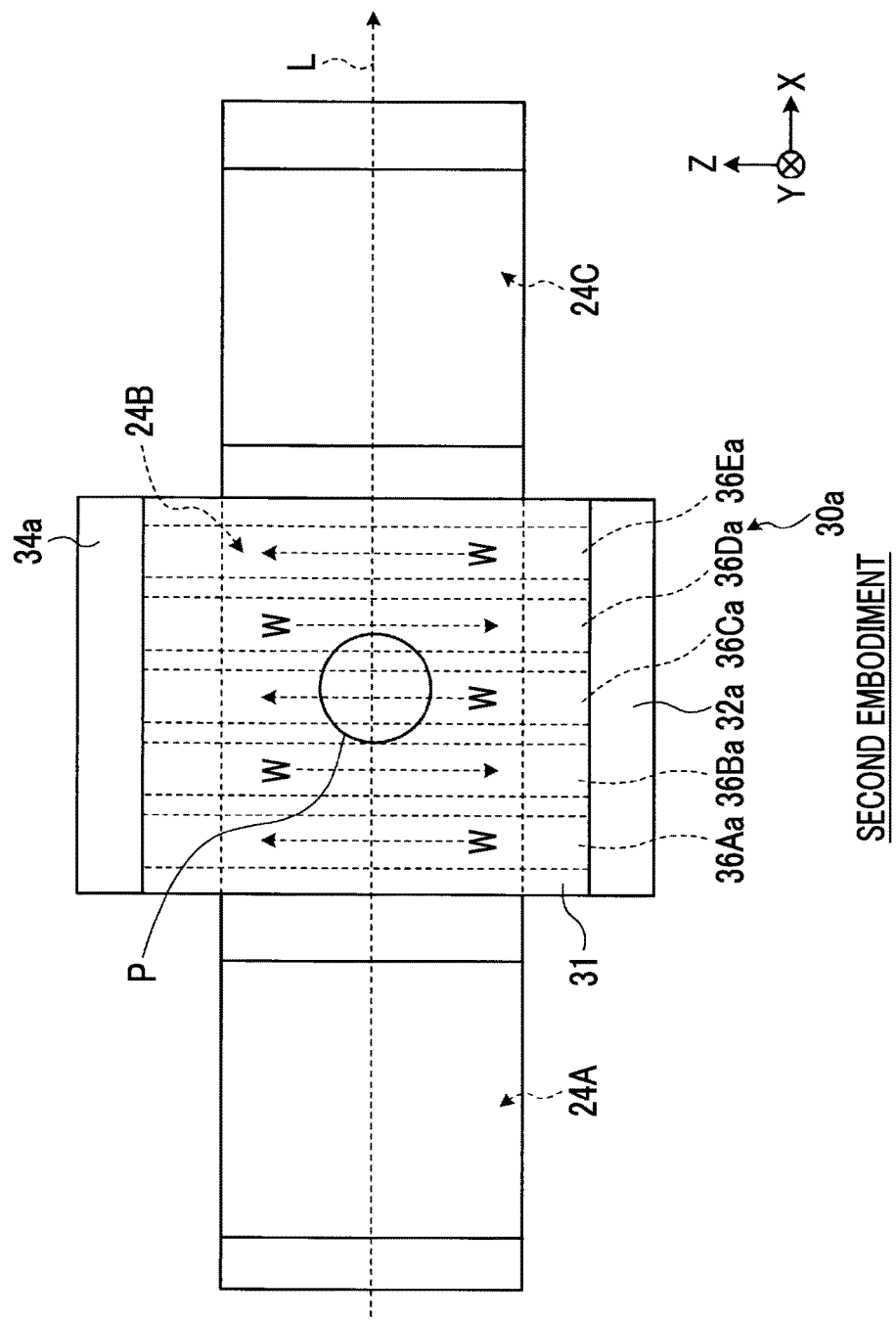

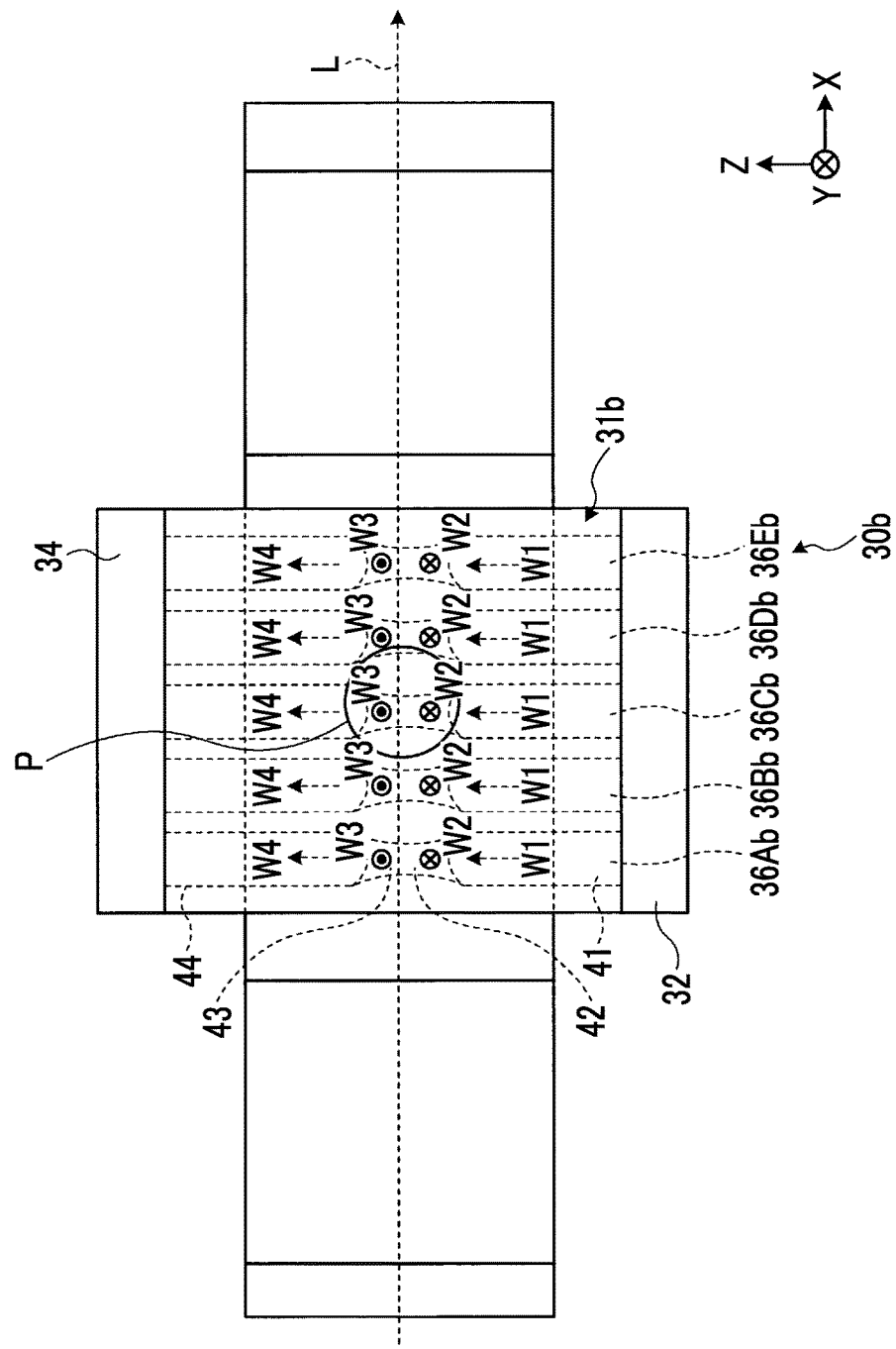

SOLID LASER AMPLIFICATION DEVICE

TECHNICAL FIELD

The present invention relates to a solid laser amplification device.

BACKGROUND ART

A solid laser is a laser using a solid for a laser medium. A solid laser amplification device is a device for increasing (amplifying) the output of a laser light by passing the laser-light through a laser medium. For example, in the case of a slab type solid laser amplification device, a laser light entering a laser medium advances in a zigzag manner in the laser medium while befog reflected by both the opposite surfaces of the laser medium, whereby amplification is performed.

Here, the laser medium is heated by the laser light passing through the inside thereof, and therefore, cooling is required. In the related art, direct cooling is used for the cooling of the laser medium. In the direct cooling, the cooling is performed, for example, by pressurizing the interior of a cooling chamber provided so as to cover the surface of the laser medium and injecting liquid nitrogen toward the surface of the laser medium in the cooling chamber.

CITATION LIST

Patent Literature

[PTL 1] Japanese Patent No. 5135207

SUMMARY OF INVENTION

Technical Problem

The laser medium reaches a higher temperature at a place where the laser light is reflected, and therefore, the temperature distribution of the laser medium becomes nonuniform. In a case where the temperature distribution of the laser medium becomes nonuniform, the performance of the laser light decreases, and therefore, it is necessary to cool the laser medium such that the temperature distribution of the laser medium becomes uniform. However, in direct injection of liquid nitrogen or the like, it is difficult to control cooling or the like such that the temperature distribution of the laser medium becomes uniform, and thus there is a problem in that it is not possible to properly suppress the nonuniformity of the temperature distribution of the laser medium.

In order to solve the above problem, the present invention has an object to provide a solid laser amplification device in which nonuniformity of a temperature distribution of a laser medium is properly suppressed.

Solution to Problem

In order to solve the above-mentioned problem and achieve the object, a solid laser amplification device of this disclosure includes: a laser medium part which has a solid medium, into which a laser light enters from an entrance part and from which the laser light is emitted from an exit part to the outside, and an amplification layer which is provided on a surface of the medium, receives the laser light in the medium, and amplifies and reflects the laser light toward the exit part; and a microchannel type cooling part which has a plurality of cooling pipelines, through which a cooling solvent passes and which are arranged in a direction parallel to a surface of the amplification layer, and a cooling surface which is provided at an outer periphery of the plurality of cooling pipelines and mounted on the surface of the amplification layer, and cools the amplification layer, in which in the cooling part, a cooling power increases as it goes toward the cooling pipeline provided at a position closer to a position facing a place receiving the laser light, of the amplification layer.

According to this solid laser amplification device, it is possible to cool the place receiving the laser light, of the amplification layer, with a higher cooling power, and therefore, it is possible to properly suppress nonuniformity of the temperature distribution of the amplification layer.

In the solid laser amplification device, it is preferable that in the cooling part, flow velocity of the cooling solvent flowing increases as it goes toward the cooling pipeline provided at a position closer to a position facing a place receiving the laser light, of the amplification layer, or a temperature of the cooling solvent flowing in decreases as it goes toward the cooling pipeline provided at a position closer to a position facing a place receiving the laser light, of the amplification layer. According to this solid laser amplification device, the cooling power for cooling the place receiving the laser light, of the amplification layer, can be properly increased, and therefore, it is possible to properly suppress the nonuniformity or the temperature distribution of the amplification layer.

In the solid laser amplification device, it is preferable that in the cooling part, a direction in which the cooling solvents flow in some of the cooling pipelines is set to be a direction opposite to a direction in which the cooling solvents flow in other cooling pipelines. According to this solid laser amplification device, a temperature gradient is alternated for each cooling pipeline, and therefore, it is possible to properly suppress the nonuniformity of the temperature distribution of the amplification layer.

In the solid laser amplification device, it is preferable that each of the plurality of cooling pipelines has a first pipeline extending in a direction approaching the cooling surface, and a second pipeline which is connected to the first pipeline and extends in a direction away from the cooling surface, and through which the cooling solvent from the first pipeline flows. According to this solid laser amplification device, the cooling of the amplification layer is performed by the cooling solvent flowing along a direction perpendicular to the cooling surface. Therefore, according to this solid laser amplification device, it is possible to suppress the influence of the temperature gradient of the cooling solvent from being transmitted to the amplification layer, and thus it is possible to properly suppress the nonuniformity of the temperature distribution of the amplification layer.

In order to solve the above-mentioned problem and achieve the object, a solid laser amplification device of this disclosure includes: a laser medium part which has a solid medium, into which a laser light enters from an entrance part and from which the laser light is emitted from an exit part to the outside, and an amplification layer which is provided on a surface of the medium, receives the laser light in the medium, and amplifies and reflects the laser light toward the exit part; and a microchannel type cooling part which has a plurality of cooling pipelines, through which a cooling solvent passes and which are arranged in a direction parallel to a surface of the amplification layer, and a cooling surface which is provided at an outer periphery of the plurality of cooling pipelines and mounted on the surface of the amplification layer, and cools the amplification layer, in which in the cooling part, a direction in which the cooling solvents flow in some of the cooling pipelines is set to be a direction opposite to a direction in which the cooling solvents flow in other cooling pipelines. According to this solid laser amplification device, a temperature gradient is alternated for each cooling pipeline, and therefore, it is possible to properly suppress the nonuniformity of the temperature distribution of the amplification layer.

In the solid laser amplification device, it is preferable that in the cooling part, flow directions of the cooling solvents in the cooling pipelines adjacent to each other are set to be directions opposite to each other. According to this solid laser amplification device, it is possible to more properly suppress the nonuniformity of the temperature distribution of the amplification layer.

In order to solve the above-mentioned problem and achieve the object, a solid laser amplification device of this disclosure includes: a laser medium part which has a solid medium, into which a laser light enters from an entrance part and from which the laser light is emitted from an exit part to the outside, and an amplification layer which is provided on a surface of the medium, receives the laser light in the medium, and amplifies and reflects the laser light toward the exit part; and a microchannel type cooling part which has a plurality of cooling pipelines, through which a cooling solvent passes and which are arranged in a direction parallel to a surface of the amplification layer, and a cooling surface which is provided at an outer periphery of the plurality of cooling pipelines and mounted on the surface of the amplification layer, and cools the amplification layer, in which each of the plurality of cooling pipelines has a first pipeline extends in a direction approaching the cooling surface, and a second pipeline which is connected to the first pipeline and extends in a direction away from the cooling surface, and through which the cooling solvent from the first pipeline flows. According to this solid laser amplification device, the cooling the amplification layer is performed by the cooling solvent flowing along a direction perpendicular to the cooling surface. Therefore, according to this solid laser amplification device, it is possible to suppress the influence of the temperature gradient of the cooling solvent from being transmitted to the amplification layer, and thus it is possible to properly suppress the nonuniformity of the temperature distribution of the amplification layer.

It is preferable that the solid laser amplification device further includes: a thermally conductive part which is provided in contact with the amplification layer and the cooling surface between the amplification layer and the cooling surface and transfers heat of the amplification layer to the cooling part. According to this solid laser amplification device, it is possible to efficiently transfer the heat of the amplification layer to the cooling part through the thermally conductive part, and therefore, it is possible to properly cool the amplification layer.

Advantageous Effects of Invention

According to the present invention, it is possible to properly suppress nonuniformity of a temperature distribution of the laser medium.

BRIEF DESCRIPTION OF DRAWINGS

FIG. 5A is a schematic diagram of a cooling part according to a second embodiment.

FIG. 6 is an explanatory diagram for explaining cooling of a cooling part according to a comparative example.

FIG. 7 is an explanatory diagram for explaining cooling of the cooling part according to the second embodiment.

FIG. 9A is an explanatory diagram for explaining cooling of the cooling part according to the third embodiment.

DESCRIPTION OF EMBODIMENTS

Hereinafter, preferred embodiments of the present invention will be described in detail with reference to the accompanying drawings. The present invention is not limited by these embodiments, and in a case where there are a plurality of embodiments, configurations made by combining the respective embodiments are also included in the present invention.

First Embodiment

Figure 1:
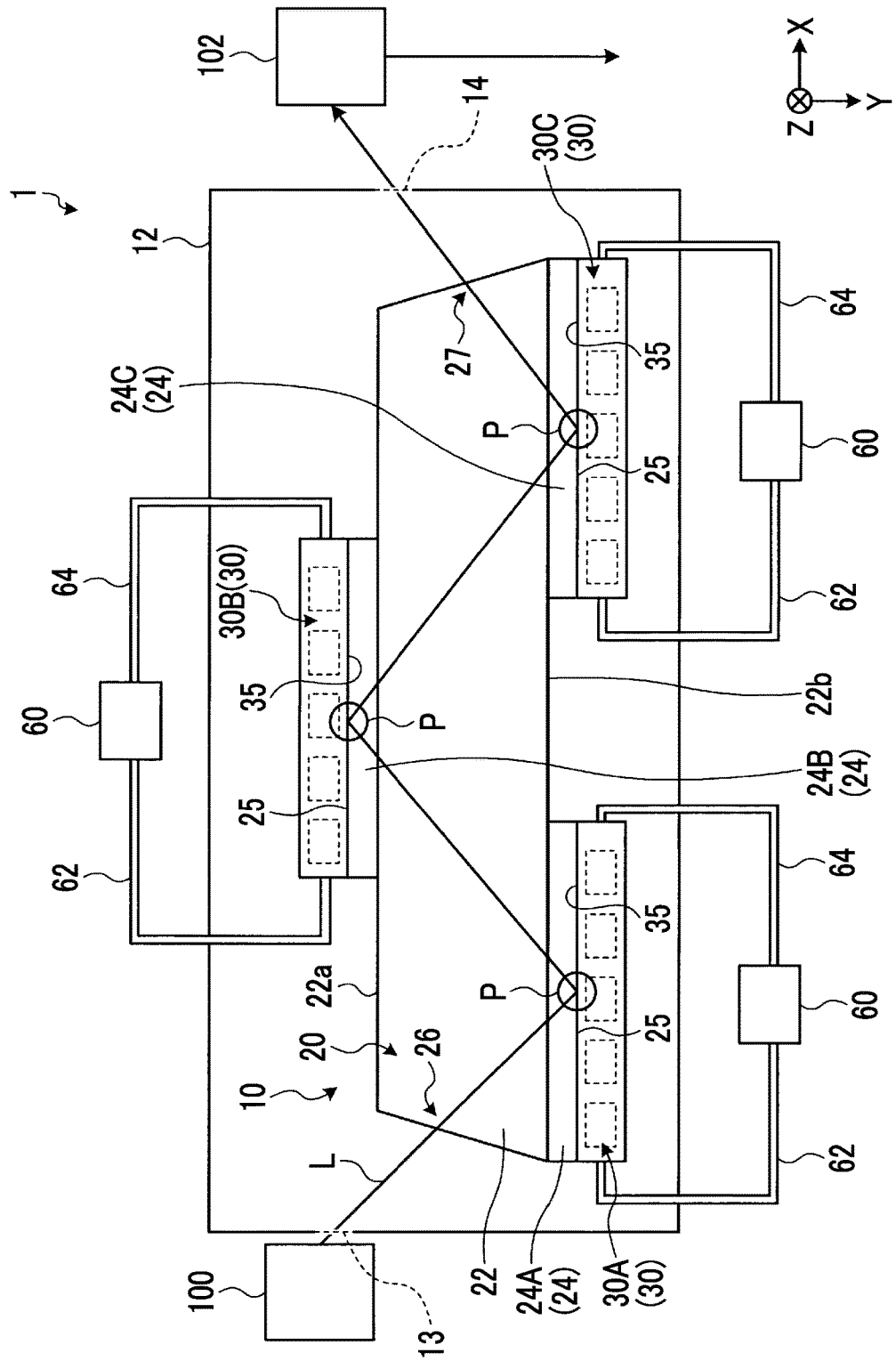
FIG. 1 is a schematic diagram showing the configuration of a solid laser device in a first embodiment.

FIG. 1 is a schematic diagram showing the configuration of a solid laser device in a first embodiment. A solid laser device 1 according to the first embodiment is a device for performing irradiation of a solid laser using a solid for a medium. Specifically, the solid laser device 1 in the first embodiment is a slab type solid laser irradiation device. As shown in FIG. 1, the solid laser device 1 has a solid laser amplification device 10, an accommodation chamber 12, a light emitting part 100, and an irradiation part 102. The light emitting part 100 is an excitation light source of a laser light L and is, for example, a laser diode. The irradiation part 102 is, for example, a laser irradiation head. The solid laser device 1 makes the laser light L excited in the light emitting part 100 pass through the solid laser amplification device 10 provided in the accommodation chamber 12, thereby amplifying the laser light and irradiates the amplified laser light L from the irradiation part 102. The solid laser device 1 performs machining or the like with the irradiation of the laser light L from the irradiation part 102. The laser light L which is irradiated by the solid laser device 1 is a high-power laser light having a heat flux of 100 W/cm$^2$ or more, for example.

As shown in FIG. 1, the accommodation chamber 12 is a chamber for accommodating the solid laser amplification device 10 therein. The accommodation chamber 12 is a chamber hermetically sealed from the outside, and in use, gas in the interior thereof is discharged by a pump or the like, so that the accommodation chamber 12 is in a vacuum state. An entrance window 13 and an exit window 14 are provided in the accommodation chamber 12, and thus the laser light from the light emitting part 100 is transmitted to the interior through the entrance window 12a and the laser light L in the interior is emitted from the exit window to the irradiation part 102.

The solid laser amplification device 10 is an amplifying device of a so-called slab type solid laser. The solid laser amplification device 10 has a laser medium part 20 and cooling parts 30A, 30B, and 30C.

The laser medium part 20 is a slab type laser medium for amplifying the laser light L. In this embodiment, the laser medium part 20 is Nd:YAG ceramics. The Nd:YAG ceramics obtained by partially doping yttrium with neodymium in a process of producing a crystal of YAG (Yttrium Aluminum Garnet). The laser medium part 20 has a medium 22 and amplification layers 24A, 24B, and 24G. The medium 22 is a light transmitting crystal (solid) such as YAG, for example. The amplification layers 24A, 21B, and 24C are layers provided on the surface of the medium 22 and are produced by doping ions of yttrium or the like on a plate made of the same material as the medium 22. The amplification layers 24A, 24B, and 24C are gain media which amplify the laser light L.

The medium 22 is a hexahedron (in this embodiment, a frustum). In the medium 22, the length thereof along a direction X is longer than the length along a direction Y. The direction Y is a direction crossing the direction X, and in this embodiment, it is a direction orthogonal to the direction X. Further, a direction Z (described later) is a direction crossing the direction X and the direction L and in this embodiment, it is a direction orthogonal to the direction X and the direction Y. In the medium 22, a surface on one side along the direction Y is an upper bottom surface 22a on the smaller area side, and a surface on the other side is a lower bottom surface 22b on the larger area side. However, the shape of the medium 22 is not limited thereto.

The amplification layers 24A and 24C are mounted on the lower bottom surface 22b with a predetermined interval therebetween along the direction X. The amplification layer 24B is mounted on the upper bottom surface 22a. The amplification layer 24B is located between the amplification layer 24A and the amplification layer 24C along the direction X. Only one amplification layer 22B is mounted on the upper bottom surface 22a. However, similar to the lower bottom surface 22b, a plurality of amplification layers may be mounted on the upper bottom surface 22a with predetermined intervals.

Hereinafter, the amplification layers 24A, 24B, and 24C will be referred to as an amplification layer 24 in a case where they are not distinguished from each other. It can be said that the amplification layer 24 is provided on each of the opposite surfaces (the upper bottom surface 22a and the lower bottom surface 24b) of the medium 22 along the direction Y. Further, it can be said that a plurality of amplification layers 24 are provided on the surface of the medium 22 at predetermined intervals along the direction X. However, the amplification layers 24 may not be provided at predetermined intervals along the direction X and may be provided over the entirety of the upper bottom surface 22a and the lower bottom surface 24b.

The laser light L enters the medium 22 from an entrance part 26 on the side surface of the medium 22. The laser light L entering the medium 22 enters the amplification layer 24. The laser light L entering the amplification layer 24 is amplified and is reflected by a surface 25 that is the surface of the amplification layer 24 on the side opposite to the medium 22. The laser light L reflected by the surface 25 enters the medium 22 again from the amplification layer 24 and is emitted from an exit part 27 on the side surface on the side opposite to the entrance part 26 along the direction X. A reflective layer which totally reflects the laser light L may be provided on the surface 25.

In the example of the first embodiment, the laser light L entering the accommodation chamber 12 enters the amplification layer 24A from the entrance part 26 through the medium 22. The laser light L entering the amplification layer 24A is amplified and reflected and enters the amplification layer 24B through the medium 22. The laser light L entering the amplification layer 24B is amplified and reflected and enters the amplification layer 24C through the medium 22. The laser light L entering the amplification layer 24C is amplified and reflected, enters the medium 22, and is emitted from the exit part 27 toward the outside (the accommodation chamber 12). In this manner, the laser light L in this embodiment advances in a zigzag manner in the direction X in the laser medium part 20. Therefore, the direction X can also be referred to as a traveling direction of the laser light L.

Figure 2:
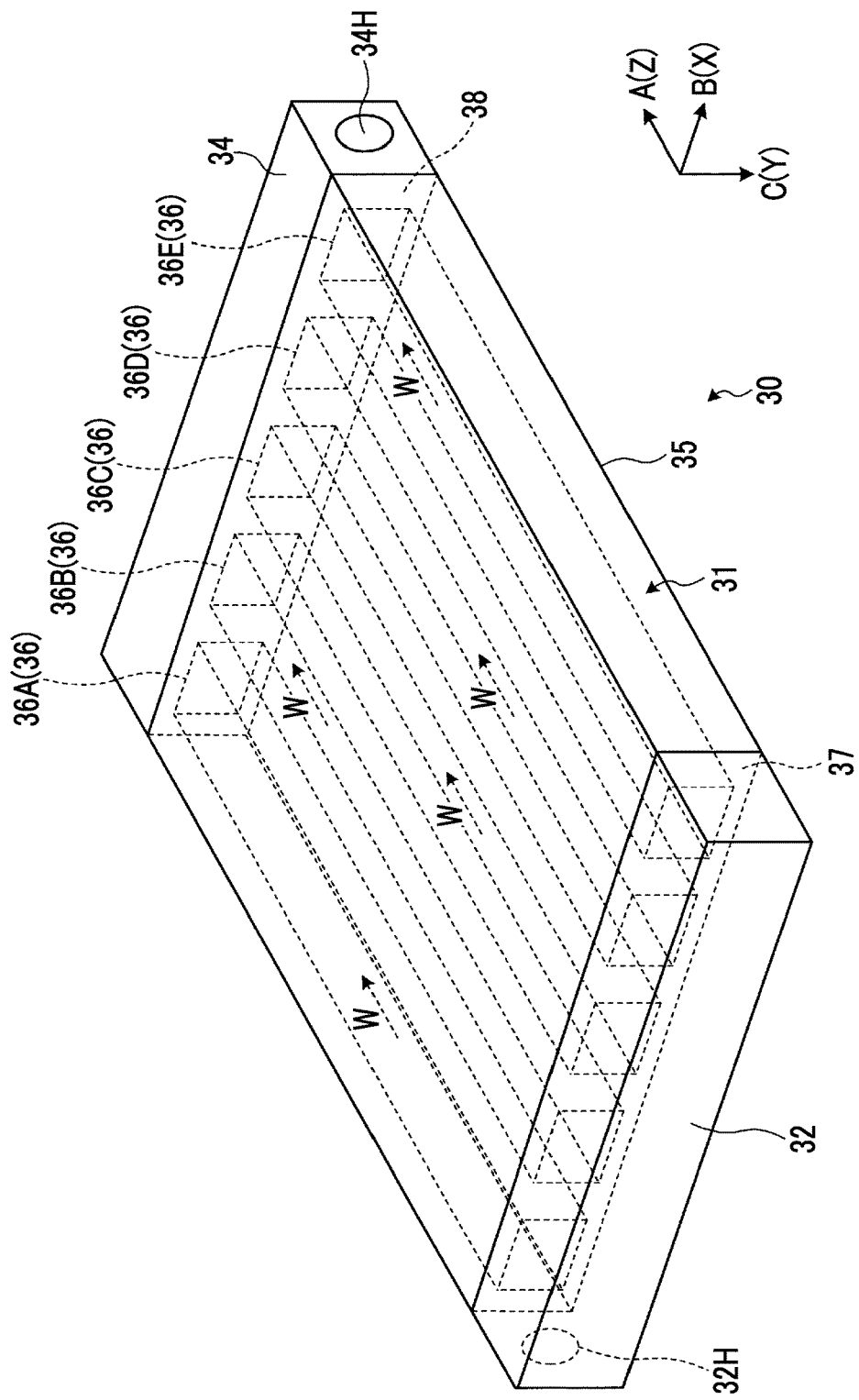
FIG. 2 is a schematic diagram of a cooling part in the first embodiment.

Next, the cooling parts 30A, 30B, and 30C will be described. Hereinafter, the cooling parts 30A, 30B, and 30C will be referred to as a cooling part 30 in a case where they are not distinguished from each other. FIG. 2 is a schematic diagram of the cooling part in the first embodiment. The cooling part 30 is a microchannel type heat exchanger. As shown in FIG. 2, the cooling part 30 has a microchannel part 31, an inlet header part 32, and an outlet header part 34.

The microchannel part 31 is a plate-shaped member having a plurality of cooling pipelines 36A, 363, 36C, 36D, and 36E opened therein. Hereinafter, the cooling pipelines 36A, 36B, 36C, 36D, and 36E will be referred to as a cooling pipeline 36 in a case where they are not distinguished from each other. The cooling pipeline 36 extends along a direction A parallel to a cooling surface 35 that is the surface of the microchannel part 31. The cooling pipeline 36 is open on a side surface 37 on one side and a side surface 38 on the other side of the microchannel part 31 along the direction A and pass through from the side surface 37 on one side to the side surface 38 on the other side. In other words, it can be said that the cooling surface 35 is provided on the outer periphery of the plurality of cooling pipelines 36. In this embodiment, the microchannel part 31 is a metal member having relatively high thermal conductivity, such as aluminum or SUS (stainless steel). However, the material is not limited thereto.

The cooling pipelines 36A, 36B, 36C, 36D, and 36E are arranged along a direction B which is a direction parallel to the cooling surface 35 of the microchannel part 31 and crosses the direction A. In the example of this embodiment, the cooling pipelines 36A, 36B, 365, 36D, and 36E are arranged at regular intervals along the direction B, and the cooling pipeline 36C is located at a central portion along the direction B. However, the cooling pipelines 36A, 36B, 36C, 36D, and 36E may not be arranged at regular intervals, and any number can be used as long as the number is plural.

The inlet header part 32 is a tubular member having a hollow inside. The inlet header part 32 is mounted on the side surface 37 on one side of the microchannel part 31. The inlet header part 32 has an opening portion (not shown) for making the internal space thereof communicate with each of the plurality of cooling pipelines 36, and an introduction opening portion 32H for introducing a cooling solvent W into the internal space.

The outlet header part 34 is a tubular member having a hollow inside. The outlet header part 34 is mounted on the side surface 38 on the other side of the microchannel part 31. The outlet header part 34 has an opening portion (not shown) for making the internal space thereof communicate with each of the plurality of cooling pipelines 36, and a lead-out opening portion 34H for leading out the cooling solvent W from the internal space to the outside.

In the cooling part 30, the cooling solvent W is introduced from the introduction opening portion 32H into the inlet header part 32, is distributed to the respective cooling pipelines 36, and flows through the respective cooling pipelines 36. The microchannel part 31 is in contact with an object to be cooled and cools the object to be cooled by the cooling solvent W flowing through each of the cooling pipelines 36. The cooling solvent W flowing through each of the cooling pipelines 36 flows toward the outlet header part 34. The cooling solvent W flowing into the outlet header part 34 is led out from the lead-out opening portion 34H to the outside, cooled on the outside, and introduced into the inlet header part 32 again. The cooling solvent W in this embodiment is a liquid in a state of being introduced into the inlet header part 32 and is, for example, liquid nitrogen, water, or the like.

Figure 3:
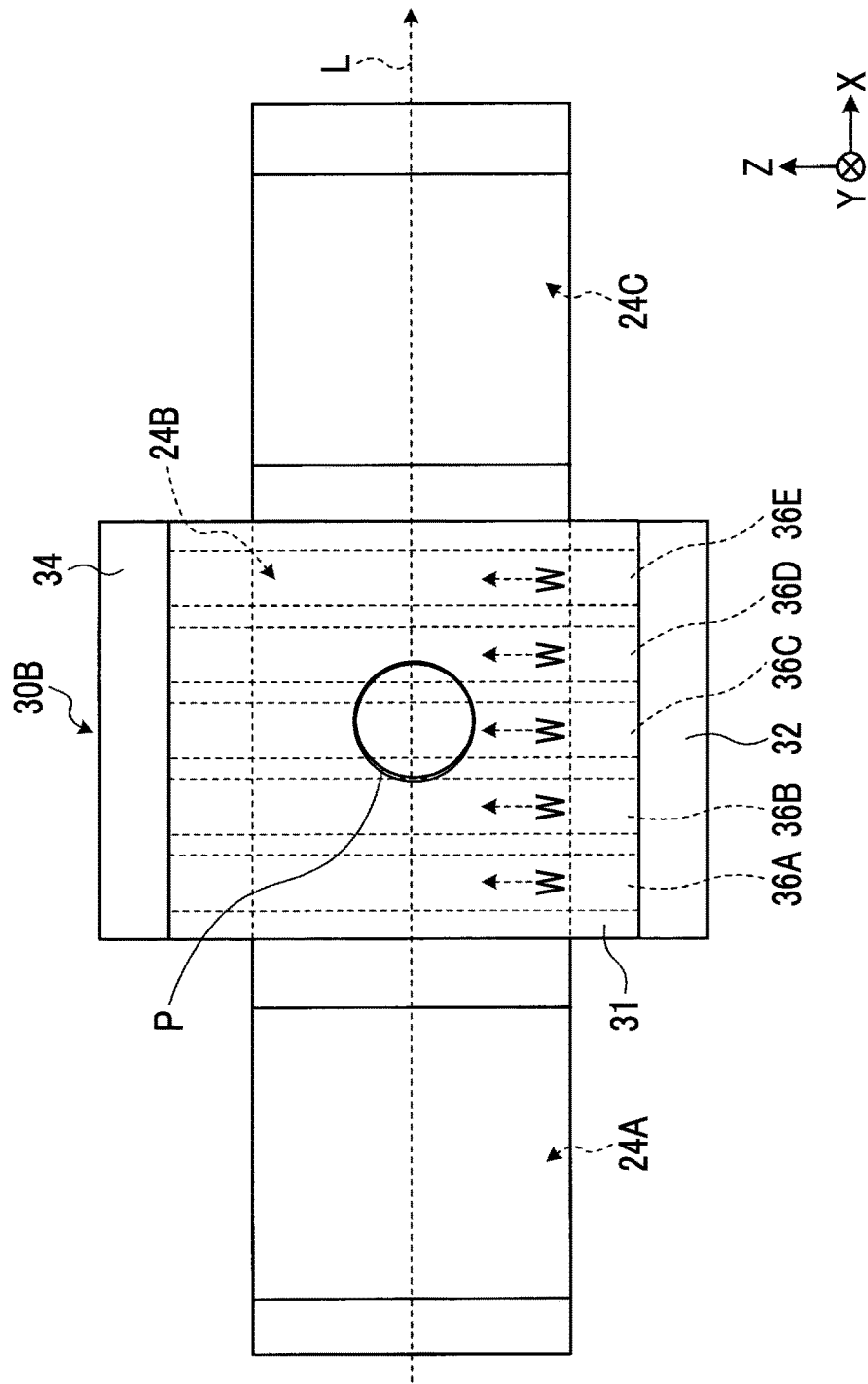
FIG. 3 is a schematic diagram of a solid laser amplification device in the first embodiment, as viewed from above.

FIG. 3 is a schematic diagram of the solid laser amplification device in the first embodiment, as viewed from above. As shown in FIGS. 1 and 3, the cooling part 30 is mounted with the cooling surface 35 thereof being in contact with the surface 25 of the amplification layer 24, and cools the amplification layer 24. The cooling part 30A mounted on the amplification layer 24A. The cooling part 30B is mounted on the amplification layer 24B. The cooling part 30C is mounted on the amplification layer 24C. Therefore, it can be said that the cooling part 30 is provided on each of the opposite surfaces (the surface on the upper bottom surface 22a side, and the surface on the lower bottom surface 24b side) of the laser medium part 20 along the direction Y. Further, it can be said that a plurality of cooling parts 30 are provided on the surface of the laser medium part 20 at predetermined intervals along the direction X. That is, the cooling part 30 is provided at only the amplification layer 24 in the laser medium part 20. The cooling part 30 is mounted on each amplification layer 24 such that the direction A in which the cooling pipeline 36 extends is along the direction Z, the direction B in which the plurality of cooling pipelines 36 are arranged is along the direction X, and the direction C orthogonal to the direction A and the direction B (the direction orthogonal to the cooling surface 35) is along the direction Y. However, the mounting direction of the cooling part 30 is not limited thereto as long as the cooling surface 35 as mounted on the surface 25 of the amplification layer 24, and for example, the direction A in which the cooling pipeline 36 extends may be along the direction X.

Further, as shown in FIG. 1, the cooling part 30 is connected to a cooling solvent cooling part 60. Specifically, the cooling solvent cooling part 60 is provided outside the accommodation chamber 12, and the cooling solvent W is introduced into the introduction opening portion 32H of the inlet header part 32 through an introduction pipe 62. Further, in the cooling solvent cooling part 60, the cooling solvent W is led out from the lead-out opening portion 34H of the outlet header part 34 through a lead-out pipe 64. The cooling solvent cooling part 60 cools the cooling solvent W from the outlet header part 34 and supplies it to the inlet header part 32 again. The cooling solvent cooling part 60 may have any configuration as long as it cools the cooling solvent W, and for example, the cooling solvent cooling part 60 may has a configuration in which natural cooling is performed by providing fins between a plurality of tubes through which the cooling solvent W passes, or a configuration in which forced cooling is performed.

As shown in FIGS. 1 and 3, the laser light advances in a zigzag manner in the direction X at a center position in the direction Z in the laser medium part 20. Further, the laser light L is reflected at a light receiving place P that is a center position in the direction X of each of the amplification layers 24A, 24B, and 24C. That is, it can be said that the light receiving place P is a place receiving (reflecting) the laser light L on the surface 25 of the amplification layer 24. The amplification layer 24 is heated by the laser light L and has the highest heat at particularly the light receiving place P. Further, in the amplification layer 24, the degree of being heated is reduced with distance from the light receiving place P. In other words, it can be said that in the amplification layer 24, a temperature increases as it goes toward the light receiving place P along the direction (the direction X and the direction Z) parallel to the surface 25. That is, in the amplification layer 24, bias occurs in a temperature distribution along the direction X, for example. In a case where bias occurs in a temperature distribution, there is a concern that the performance of the laser light L may decrease.

Here, the cooling part 30 is mounted such that the direction B in which the plurality of cooling pipelines 36 are arranged is along the direction X. That is, in the cooling part 30, the cooling pipeline 36C is located at a place facing the light receiving place P that is the center position in the direction X of the amplification layer 24. Further, in the cooling part 30, the cooling pipelines 36D and 36E are arranged in this order in one direction away from the light receiving place P along the direction X, and the cooling pipelines 36B and 36A are arranged in this order in the other direction away from the light receiving place P along the direction X.

In the first embodiment, in the cooling part 30, a cooling power increases as it goes toward the cooling pipeline 36 provided at a position closer to the light receiving place P. That is, in the first embodiment, in the cooling part 30, the cooling power of the cooling pipeline 36C provided at a position facing the light receiving place P (the closest position thereto) is greater than the cooling powers of the cooling pipelines 36A, 36B, 36D, and 36E provided at positions farther from the light receiving place P than the cooling pipeline 36C. Further, in the cooling part 30, the cooling power of the cooling pipeline 36B is greater than that of the cooling pipeline 36A provided at a position farther from the light receiving place P than the cooling pipeline 36B. Similarly, in the cooling part 30, the cooling power of the cooling pipeline 36D is greater than that of the cooling pipeline 36E provided at a position farther from the light receiving place P than the cooling pipeline 36D. Here, the cooling power indicates the magnitude of the amount of heat that can be taken away from the object to be cooled in heat exchange, and in a case where the cooling power is high, the amount of heat that can be taken away from the body to be cooled increases.

In the cooling part 30, the cooling power increases as it goes toward the cooling pipeline 36 provided at a position closer to the light receiving place P, whereby a place having a high temperature, of the amplification layer 24, can be cooled with a higher cooling power. Therefore, it is possible to suppress bias of a temperature distribution along the direction X of the amplification layer 24.

Specifically, in the cooling part 30 in the first embodiment, the flow velocity of the cooling solvent W flowing therein increases as it goes toward the cooling pipeline 36 provided at a position closer to the light receiving place P, whereby the cooling power is increased. For example, in the cooling part 30, by making the flow path cross-sectional area of the cooling pipeline 36C smaller than the others, it is possible to increase the flow velocity. In this case, it is preferable to make the heat transfer area of the cooling pipeline 36C to the amplification layer 24 the same as those of other cooling pipelines 36. For example, this can be realized by keeping the cross-sectional area of the cooling pipeline 36C in a case of being viewed from the direction C the same while reducing the flow path area by making the width along the direction C of the cooling pipeline 36C smaller than those of other cooling pipelines 36.

The cooling part 30 is not limited to configuration of increasing the flow velocity as long as it is possible to increase the cooling power, and any configuration can be adopted. For example, in the cooling part 30, it is also possible to increase the cooling power by lowering the temperature of the cooling solvent W flowing-in as it goes toward the cooling pipeline 36 provided at a position closer to the light receiving place P. In this case, the cooling part 30 has the following structure, for example. That is, a partition is provided in the inlet header part 32 to partition a space supplying the cooling solvent W to the cooling pipeline 36C and a space for supplying the cooling solvent W to other cooling pipelines 36, and the cooling solvent W having a lower temperature is supplied to only the space for supplying the cooling solvent W to the cooling pipeline 36C. Further, in the cooling part 30, it is also possible to increase the cooling power by increasing the heat transfer area to the amplification layer 24 as it goes toward the cooling pipeline 36 provided at a position closer to the light receiving place P.

Figure 4:
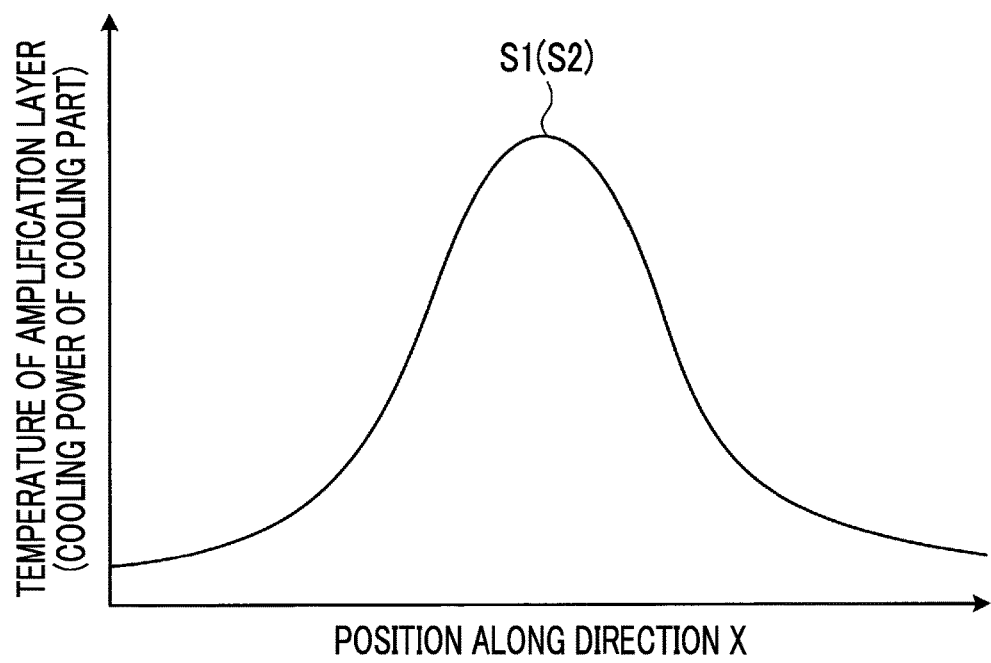
FIG. 4 is a graph showing an example of a temperature distribution of an amplification layer.

Here, the cooling power of the cooling part 30 may be determined based on the measurement result of the temperature distribution of the amplification layer. FIG. 4 is a graph showing an example of the temperature distribution of the amplification layer. The horizontal axis of FIG. 4 shows the position of the amplification layer 24 along the direction X and the vertical axis of FIG. 4 shows the temperature of the amplification layer 24. A curve S1 in FIG. 4 shows an example of the measurement result of the temperature distribution of the amplification layer 24 for each position along the direction X. As shown by the curve S1, in the example of FIG. 4, the amplification layer 24 has the highest temperature at the center position (the light receiving place P) along the direction X, and the temperature decreases in a curved fashion with distance from the center position. The cooling power of the cooling part 30 (the cooling power for each cooling pipeline 36) may be determined based on the curve S1. In this case, the cooling power is determined such that the distribution of the cooling power of the cooling part 30 (the cooling power for each cooling pipeline 36) shows a curve S2 in FIG. 4. The curve S2 is a curve in a case where the vertical axis of FIG. 4 is set to be the cooling power of the cooling part 30, and shows an example of the temperature distribution of the cooling part 30 (the cooling pipeline 36) for each position along the direction X. The cooling power gradient of the curve S2 is the same as the temperature gradient of the curve S1. In this manner, the cooling power is determined based on the measurement result of the actual temperature distribution of the amplification layer, whereby it is possible to more properly suppress bias of the temperature distribution.

As described above, the solid laser amplification device 10 according to the first embodiment has the laser medium part 20 having the medium 22 and the amplification layer 24, the plurality of cooling pipelines 36, and the cooling surface 35. The medium 22 is a solid medium, into which the laser light L enters from the entrance part 26 and from which the laser light L is emitted from the exit part 27 to the outside. The amplification layer 24 is provided on the surface of the medium 22, receives the laser light L in the medium 22, and amplifies and reflects the laser light L toward the exit part 27. Further, the plurality of cooling pipelines 36 make the cooling solvent W flow therein and are arranged in a direction parallel to the surface 25 of the amplification layer 24. Further, the cooling surface 35 is provided on the outer periphery of the cooling pipelines 36 and is mounted on the surface 25 of the amplification layer 24. Then, in the cooling part 30, the cooling power increases as it goes toward the cooling pipeline 36 provided at a position closer to a position facing a place (the light receiving place P) receiving the laser light L of the amplification layer 24.

In the solid laser amplification device 10, the cooling power increases as it goes toward the cooling pipeline 36 provided at a position closer to a position facing a place (the light receiving place P) receiving the laser light L of the amplification layer 24. In the solid laser amplification device 10, the light receiving place P that is a place where the temperature of the amplification layer 24 is high can be cooled with a higher cooling power, and therefore, it is possible to suppress the bias of the temperature distribution of the amplification layer 24, and thus possible to suppress a decrease in the performance of the laser light L.

In the solid laser amplification device 10, the microchannel type cooling part 30 is mounted on the amplification layer 24. Therefore, the heat of the amplification layer 24 is indirectly cooled by the cooling solvent W flowing in the cooling part 30. Here, in a case of directly cooling the amplification layer 24, it is necessary to perform the cooling, for example, by pressurizing the interior of a cooling chamber provided so as to cover the surface of the amplification layer 24 and in liquid nitrogen toward the surface of the amplification layer 24 in the cooling chamber. In the case of this direct cooling, the cooling chamber in which liquid nitrogen is injected needs to be hermetically sealed for cooling and is hermetically sealed from the outside, for example, by providing a sealing material between the amplification layer 24 and the cooling chamber. However, due to thermal elongation or the like due to a change in the temperature of the amplification layer 24, there is a case where sealing with the sealing material becomes difficult. In a case where the sealing is not properly performed, there is a concern that the cooling of the amplification layer 24 may not be properly performed. However, as described above, in the solid laser amplification device 10, indirect cooling is performed, and therefore, it is not necessary to perform sealing in order to cool the laser medium part 20, unlike the direct cooling in which, for example, liquid nitrogen is injected. Therefore, according to the solid laser amplification device 10, it is possible to properly cool the laser medium part 20.

Further, in the solid laser amplification device 10, in the cooling part 30, the flow velocity of the cooling solvent W flowing therein increases as it goes toward the cooling pipeline 36 provided at a position closer to the position facing the light receiving place P, or the temperature of the cooling solvent W flowing-in decreases as it goes toward the cooling pipeline 36 provided at a position closer to the position facing the light receiving place P. In this way, in the solid laser amplification device 10, it is possible to properly increase the cooling power of the cooling pipeline 36 provided at a position closer to a position facing the light receiving place P, and therefore, the bias of the temperature distribution of the amplification layer 24 is properly suppressed.

Second Embodiment

Next, a second embodiment will be described. A solid laser amplification device 10a according to the second embodiment is different from that of the first embodiment in that the flow directions of the cooling solvents W in the cooling pipelines adjacent to each other are opposite directions to each other. In the second embodiment, with respect to parts having configurations shared by the first embodiment, description thereof is omitted.

Figure 5B:
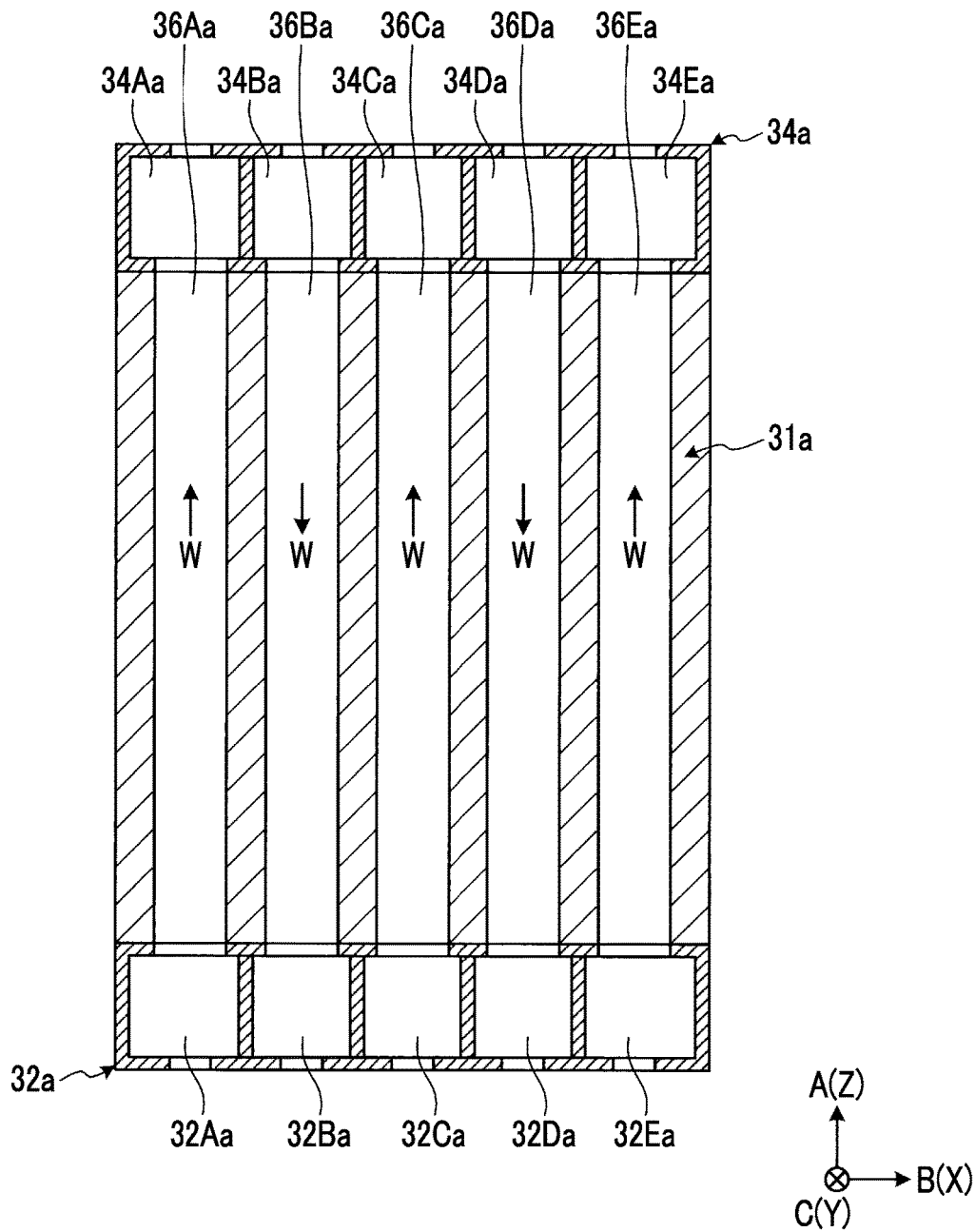
FIG. 5B is a schematic diagram of the cooling part according to the second embodiment.

FIGS. 5A and 5B are schematic diagrams of a cooling part according to the second embodiment. FIG. 5A is a schematic perspective view of a cooling part 30a according to the second embodiment. FIG. 5B is a schematic sectional view of the cooling part 30a according to the second embodiment. As shown in FIGS. 5A and 5B, the cooling part 30a according to the second embodiment has a microchannel part 31a, a first header part 32a, and a second header part 34a. The microchannel part 31a is a plate-shaped member having a plurality of cooling pipelines 36Aa, 36Ba, 36Ca, 36Da, and 36Ea opened therein. The shapes of the microchannel part 31a and the cooling pipelines 36Aa, 36Ba, 36Ca, 36Da, and 36Ea are the same as those in the first embodiment. However, the cooling pipelines 36Aa, 36Ba, 36Ca, 36Da, and 36Ea may not have the cooling powers different from each other as in the first embodiment and may have the same cooling power. Hereinafter, the cooling pipelines 36Aa, 36Ba, 36Ca, 36Da, and 36Ea will be referred to as a cooling pipeline 36a in a case where they are not distinguished from each other.

The first header part 32a is a tubular member having a hollow inside. The first header part 32a is mounted on the side surface 37 on one side of the microchannel part 31a. As shown in FIG. 5B, the internal space of the first header part 32a is partitioned into spaces 32Aa, 32Ba, 32Ca, 32Da, and 32Ea by a plurality of partitions. Each of the spaces 32Aa, 32Ba, 32Ca, 32Da, and 32Ea is provided with an opening portion making the cooling solvent W flow to the cooling solvent cooling part 60.

The second header part 34a is a tubular member having a hollow inside. The second header part 34a is mounted on the side surface 36 on the other side of the microchannel part 31a. As shown in FIG. 5B, the internal space of the second header part 34a is partitioned into spaces 34Aa, 34Ba, 34Ca, 34Da, and 34Ea by a plurality of partitions. Each of the spaces 34Aa, 34Ba, 34Ca, 34Da, and 34Ea is provided with as opening portion making the cooling solvent W flow to the cooling solvent cooling part 60.

In the cooling part 30a, the flow directions of the cooling solvents W is the cooling pipelines 36a adjacent each other are directions opposite to each other. Specifically, in the cooling pipelines 36Aa, 36Ca, and 36Ea, the cooling solvent W flows from the space 32Aa toward the space 34Aa. In the cooling pipelines 36Ba and 36Da, the cooling solvent W flows from the space 34Ba toward the space 32Ba. However, in the cooling pipelines 36a, it is acceptable if a direction in which the cooling solvents W flow in some of the cooling pipelines 36a is a direction opposite to a direction in which the cooling solvents W flow in other cooling pipelines 36a, and the flow directions of the cooling solvents W in the cooling pipelines 36a adjacent to each other may not be opposite to each other. In this case, for example, a configuration in which in the cooling pipelines 36Aa, 36Ba, and 36Ea, the cooling solvent W flows from the space 32Aa toward the space 34Aa and in the cooling pipelines 36Ca and 36Da, the cooling solvent W flows from the space 34Ba toward the space 32Ba can be given. In this manner, in the cooling part 30a, by making the directions of the cooling solvents W flowing through the cooling pipelines 36a different from each other, it is possible to suppress the bias of the temperature distribution of the amplification layer 24. Hereinafter, description will be made using a comparative example.

FIG. 6 is an explanatory diagram for explaining cooling of a cooling part according to the comparative example. FIG. 7 is an explanatory diagram for explaining cooling of the cooling part according to the second embodiment. As shown in FIG. 6, in a cooling part 30X according to the comparative example, in all the cooling pipelines, the cooling solvent W flows from an inlet header part 32X toward an outlet header part 34X, and the flow directions are the same. In the cooling part 30X, the cooling powers in the cooling pipelines are equal to each other.

In the comparative example, the cooling solvents W flowing through all the cooling pipelines perform cooling by heat exchange with the amplification layer 24, and therefore, a temperature as it goes toward the outlet header part 34X from the inlet header part 32X. Here, the amplification layer 24 also exhibits temperature distribution corresponding to the cooling solvent W, and therefore, the temperature of the amplification layer 24 on the outlet header part 34X side becomes higher than the temperature of the amplification layer 24 on the inlet header part 32X side. That is, in the comparative example, there is a concern that bias may occur in the temperature distribution of the amplification layer 24.

On the other hand, as shown in FIG. 7, in the cooling part 30a according to the second embodiment, the flow directions of the cooling solvents W in the cooling pipelines 36a are alternated. In the cooling solvents W flowing through the cooling pipelines 36Aa, 36Ca, and 36Ea, a temperature rises as they go toward the second header part 34a from the first header part 32a. On the other hand, in the cooling solvents W flowing through the cooling pipelines 36Ba and 36Da, a temperature rises they go toward the first header part 32a from the second header part 34a. In this manner, in the cooling part 30a, a temperature Gradient is alternated for each cooling pipeline 36a, and therefore, the temperature distribution of the amplification layer 24 becomes more uniform than in the comparative example.

As described above, in the solid laser amplification device 10a in the second embodiment, in the cooling part 30a, the direction in which the cooling solvents W flow in some of the cooling pipelines 36a is set to be a direction opposite to the direction in which the cooling solvents W flow in other cooling pipelines 36a. In this way, a temperature gradient is alternated for each cooling pipeline 36a, and therefore, it is possible to suppress the bias of the temperature distribution of the amplification layer 24.

Further, in the cooling part 30a, the flow directions of the cooling solvents W in the cooling pipelines 36a adjacent to each other are set to be directions opposite to each other. In this way, in the solid laser amplification device 10a in the second embodiment, it possible to more properly suppress the bias of the temperature distribution of the amplification layer 24.

Third Embodiment

Next, a third embodiment will be described. A solid laser amplification device 10b according to the third embodiment is different in the shape of the cooling pipeline from that of the first embodiment. In the third embodiment, with respect to parts having configurations shared by the first embodiment, description thereof is omitted.

Figure 8:
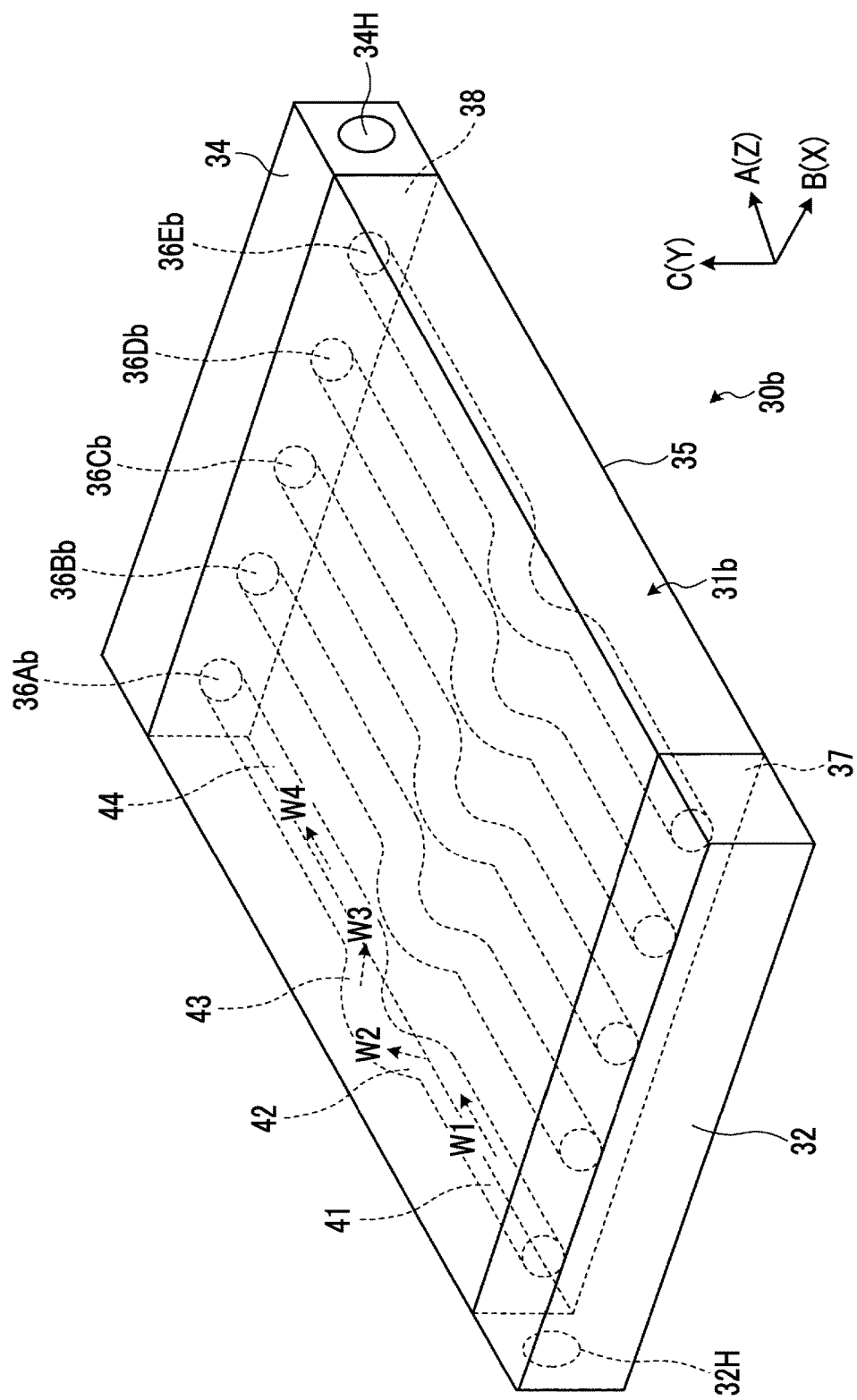
FIG. 8 is a schematic diagram of a cooling part according to a third embodiment.

FIG. 8 is a schematic diagram of a cooling part according to the third embodiment. As shown in FIG. 8, a cooling part 30b according to the third embodiment has a microchannel part 31b, the inlet header part 32, and the outlet header part 34. The microchannel part 31b a plate-shaped member having a plurality of cooling pipelines 36Ab, 36Bb, 36Cb, 36Db, and 36Eb opened therein. The cooling pipelines 36Ab, 36Bb, 36Cb, 36Db, and 36Eb may have the cooling powers different from each other as in the first embodiment and may have the same cooling power. Hereinafter, the cooling pipelines 36Ab, 36Bb, 36Cb, 36Db, and 36Eb will be referred to as a cooling pipeline 36b in a case where they are not distinguished from each other.

The cooling pipeline 36b has an inlet pipeline 41, a first pipeline 42, a second pipeline 43, and an outlet pipeline 44. The inlet pipeline 41 is a pipeline extending along the direction A from the side surface 37 on one side of the microchannel part 31b and is provided in the vicinity of the surface on the side opposite to the cooling surface 35. The first pipeline 42 is a pipeline connected to the inlet pipeline 41 and extends to the vicinity of the cooling surface 35 in a direction approaching the cooling surface 35 toward the direction C. The second pipeline 43 is a pipeline which is connected to the first pipeline 42 and through which the cooling solvent W from the first pipeline 42 flows. The second pipeline 43 extends to the vicinity of the surface on the side opposite to the cooling surface 35 in a direction away from the cooling surface 35 toward the direction opposite to the direction C. The outlet pipeline 44 is a pipeline connected to the second pipeline 43 and extends to the side surface 38 on the other side of the microchannel part 31b along the direction A. The outlet pipeline 44 is also provided in the vicinity of the surface on the side opposite to the cooling surface 35. Further, the first pipeline 42 and the second pipeline 43 are provided at the central portion of the microchannel part 31b along the direction A.

In the cooling pipeline 36b, the cooling solvent W from the inlet header part 32 flows through the inlet pipeline 41, the first pipeline 42, the second pipeline 43, and the outlet pipeline 44 in this order, and the cooling solvent W is led out to the outlet header part 34. Here, the cooling solvent W flowing through the inlet pipeline 41 is set to be a cooling solvent W1, the cooling solvent W flowing through the first pipeline 42 is set to be a cooling solvent W2, the cooling solvent W flowing through the second pipeline 43 is set to be a cooling solvent W3, and the cooling solvent W flowing through the outlet pipeline 44 is set to be a cooling solvent W4. The cooling solvent W flows in the inlet pipeline 41 along the direction A and flows at a position away from the cooing surface 35 (in the vicinity of the surface on the side opposite to the cooling surface 35). The cooling solvent W2 flows through the first pipeline 42 to the vicinity of the cooling surface 35 in the direction approaching the cooling surface 35 toward the direction C. The cooling solvent W3 flows through the second pipeline 43 to the vicinity of the surface on the side opposite to the cooling surface 35 in the direction away from the cooling surface 35 toward the direction opposite to the direction C. The cooling solvent W4 flows in the outlet pipeline 14 along the direction A and flows at a position away from the cooling surface 35 (in the vicinity of the surface on the side opposite to the cooling surface 35). In the cooling part 30b, the cooling solvents W1, W2, W3, and W4 flow through the cooling pipeline 36b, as described above, and therefore, it is possible to suppress the bias of the temperature distribution of the amplification layer 24. Hereinafter, this will be specifically described.

Figure 9B:
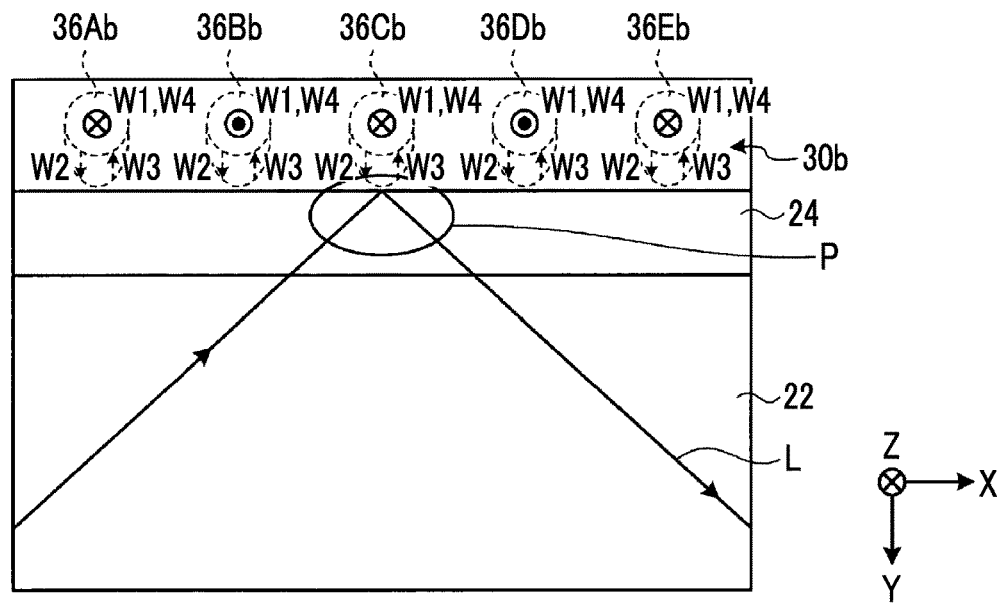
FIG. 9B is an explanatory diagram for explaining cooling of the cooling part according to the third embodiment.
Figure 9C:
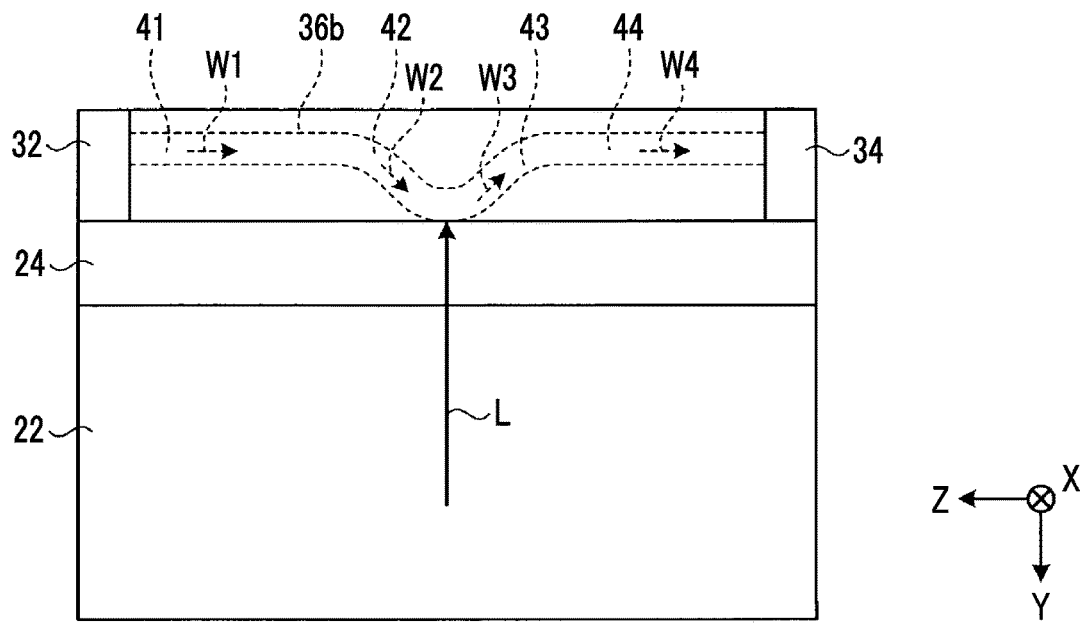
FIG. 9C is an explanatory diagram for explaining cooling of the cooling part according to the third embodiment.

FIGS. 9A to 9C are explanatory diagrams for explaining cooling of the cooling part according to the third embodiment. FIG. 9A is a schematic diagram of the cooling part 30b as viewed from the above, FIG. 9B is a schematic diagram of the cooling part 30b as viewed from the front, and FIG. 9C is a schematic diagram of the cooling part 30b as viewed from the side. As shown in FIGS. 9A to 9C, the inlet pipeline 41 is located further toward the side of an end face on one side along the direction Z than the center position (the light receiving place P) of the amplification layer 24. The outlet pipeline 44 is located further toward the side of an end face on the other side along the direction Z than the center position (the light receiving place P) of the amplification layer 24. Further, the first pipeline 42 and the second pipeline 43 are disposed at a position facing the center position (the light receiving place P) of the amplification layer 24 along the direction Z. The cooling part 30b performs the cooling of the amplification layer 24 with the cooling solvents W2 and W3 flowing in the direction (the direction Y) perpendicular to the cooling surface 35 in the vicinity of the light receiving place P. Therefore, the temperature of the cooling solvent W4 downstream of the cooling solvents W2 and W3 becomes higher than the temperature of the cooling solvent W1 upstream of the cooling solvents W2 and W3. However, in the cooling part 30b, the inlet pipeline 41 and the outlet pipeline 44 are located apart from the cooling surface 35. Therefore, in the cooling part 30b, it is possible to suppress the influence of the temperature gradients of the cooling solvents W1 and W4 flowing along the direction (the direction Z) parallel to the cooling surface 35 from being transmitted to the amplification layer 24 facing the cooling part 30b, and thus it become possible to make the temperature distribution the amplification layer 24 more uniform than that in the comparative example described above.

As described above, in the solid laser amplification device 10b according to the third embodiment, each of the plurality of cooling pipelines 36b has the first pipeline extending in a direction approaching the cooling surface 35, and the second pipeline 43 which is connected to the first pipeline 42 and extends in a direction away from the cooling surface 35 and through which the cooling solvent W from the first pipeline 42 flows. In the cooling part 30b, the cooling of the amplification layer 24 is performed by the cooling solvents W2 and W3 of the first pipeline 42 and the second pipeline 43, which flow in the direction (the direction Y) perpendicular to the cooling surface 35, rather than the cooling solvent W (the cooling solvents W1 and W4) flowing in the direction (the direction Z) parallel to the cooling surface 35. Therefore, according to the solid laser amplification device 10b, it is possible to suppress the influence of the temperature gradient of the cooling solvent W from being transmitted to the amplification layer 24, and thus it is possible to suppress the bias of the temperature distribution of the amplification layer 24.

Figure 10:
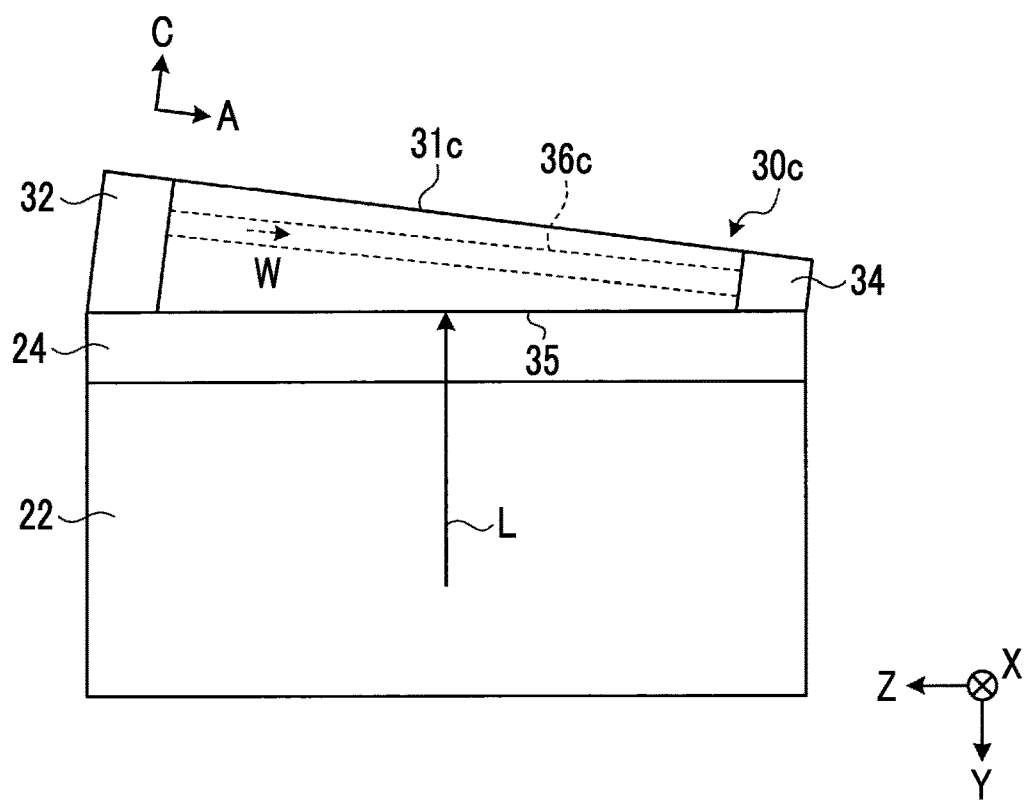
FIG. 10 is a schematic diagram showing the configuration a cooling part according to another example of the third embodiment.

FIG. 10 is a schematic diagram showing the configuration of a cooling part according to another example of the third embodiment. The configuration of the cooling part is not limited to the configurations described in the first to third embodiments and may be, for example, a configuration as in a cooling part 30c described below. In the cooling part 30c, the distance between a cooling pipeline 36c and the cooling surface 35 is varied along the direction Z. FIG. 10 is a schematic diagram of the cooling part 30c as viewed from the side. As shown in FIG. 10, in the cooling part 30c, the length (the thickness) of a microchannel part 31c along the direction C is varied along the direction A which is a direction in which the cooling pipeline 36c extends. The thickness of the microchannel part 31c decreases toward the outlet header side from the inlet header part 32 side. The cooling pipeline 36c extends linearly along the direction A. Therefore, the distance between the cooling pipeline 36c and the cooling surface 35 decreases as it goes toward the downstream side of the cooling solvent W from the upstream side of the cooling solvent W along the direction Z. Also by varying the distance between the cooling pipeline 36c and the cooling surface 35 along the direction Z in this manner, it is possible to suppress the bias of the temperature distribution of the amplification layer 24, similar to the second embodiment or the third embodiment. In a case of varying the distance between the cooling pipeline 36c and the cooling surface 35, it is not limited to the example of FIG. 10, and for example, the distance between the cooling pipeline 36c and the cooling surface 35 may increase as it goes toward the downstream side of the cooling solvent W from the upstream side of the cooling solvent W along the direction Z.

Modification Example

Next, a modification example will be described. A solid laser amplification device 10d according to the modification example is different from that of the first embodiment in that in the modification example, a thermally conductive part for transferring the heat of the amplification layer 24 to the cooling part 30 is provided between the amplification layer 24 and the cooling part 30. In the modification example, with respect to parts having configurations shared by the first embodiment, description thereof is omitted.

Figure 11:
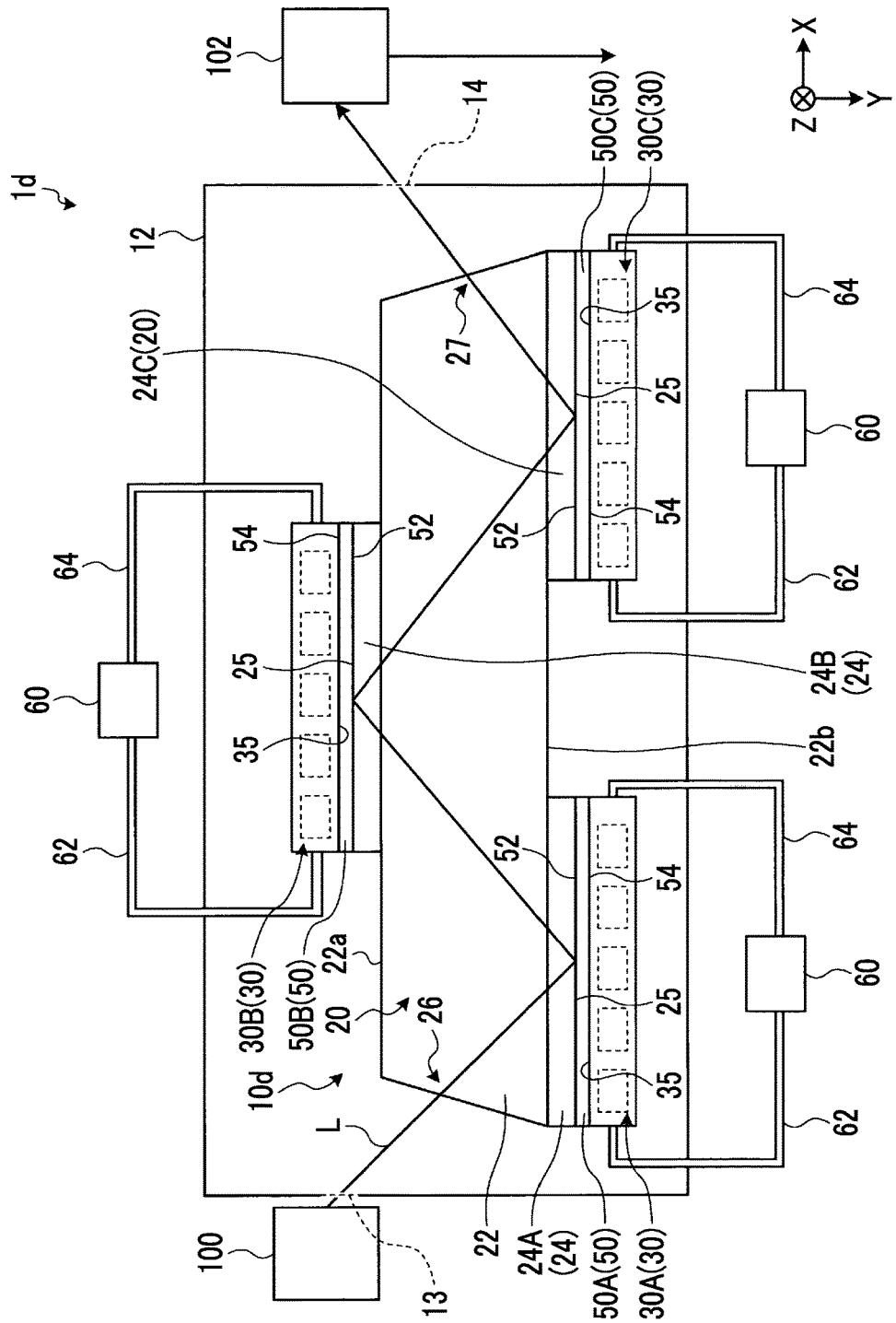
FIG. 11 is a schematic diagram showing the configuration of a solid laser device in a modification example.
Figure 12:
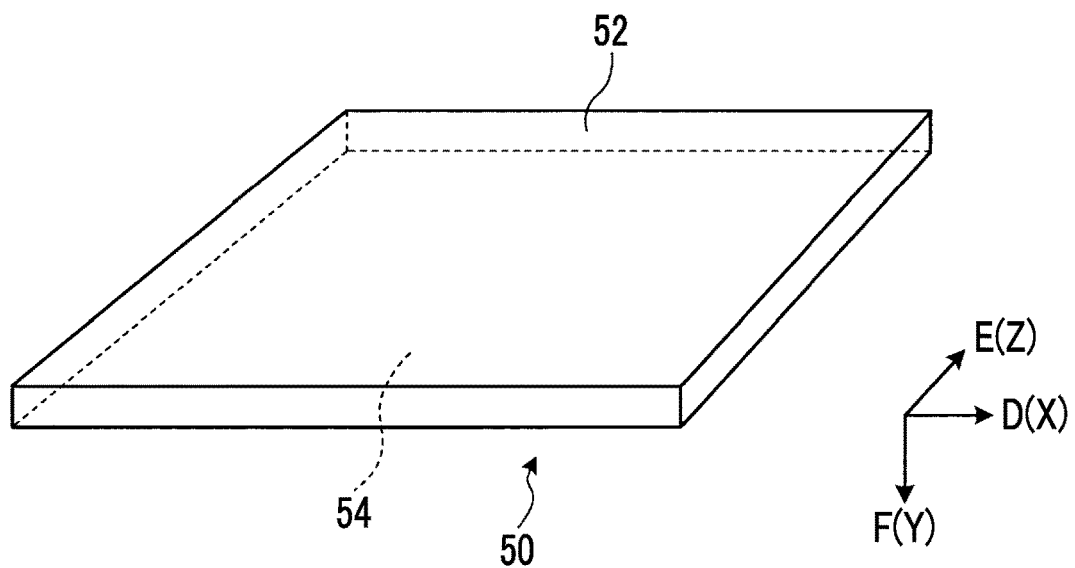
FIG. 12 is a schematic diagram showing the shape of a thermally conductive part.

FIG. 11 is a schematic diagram showing the configuration of a solid laser device in the modification example. FIG. 12 is a schematic diagram showing the shape of the thermally conductive part. As shown in FIG. 11, in a solid laser device 1d in the modification example, the solid laser amplification device 10d has thermally conductive parts 50A, 50B, and 50C. Hereinafter, the thermally conductive parts 50A, 50B, and 50C will be referred to as a thermally conductive part 50 in a case where they are not distinguished from each other.

As shown in FIGS. 11 and 12, the thermally conductive part 50 is a plate-shaped member having high thermal conductivity, is provided in contact with the amplification layer 24 and the cooling part 30 between the amplification layer 24 and the cooling part 30, and transfers the heat of the amplification layer 24 to the cooling part 30. It is preferable that the thermally conductive part 50 is fixedly provided in close contact with the amplification layer 24 and the cooling part 30 between the amplification layer 24 and the cooling part 30. Specifically, in the thermally conductive part 50A, a surface 52 on one side is in contact with the surface 25 of the amplification layer 24A and a surface 54 on the other side is in contact with the cooling surface 35 of the cooling part 30A. Similarly, in the thermally conductive part 50B, the surface 52 on one side is in contact with the surface 25 of the amplification layer 24B and the surface 54 on the other side is in contact with the cooling surface 35 of the cooling part 30B. Similarly, in the thermally conductive part 50C, the surface 52 on one side is in contact with the surface 25 of the amplification layer 24C and the surface 54 on the other side is in contact with the cooling surface 35 of the cooling part 30C. Therefore, it can be said that the thermally conductive part 50 is provided on each of the opposite surfaces (the surface on the upper bottom surface 22a side and the surface on the lower bottom surface 24b side) of the laser medium part 20 along the direction Y. Further, it can be said that a plurality of thermally conductive parts 50 are provided on the surface of the laser medium part 20 at predetermined intervals along the direction X. In other words, the thermally conductive part 50 is provided at only the amplification layer 24 which reaches a high temperature by receiving the laser light L in the laser medium part 20.

The thermally conductive part 50 is made of a material having thermal conductivity higher than those of the laser medium part 20 and the cooling part 30, and in this embodiment, it is pitch type CFRP (Carbon Fiber Reinforced Plastics). The thermally conductive part 50 extends along directions D and E which are directions parallel to the surface (the surface 52 on one side and the surface 54 on the other side), and has a predetermined thickness along a direction F which a direction perpendicular to the surface. The thickness along the direction F of the thermally conductive part 50 in this embodiment is greater than or equal to 0.1 mm and less than or equal to 1 mm. However, it is not limited thereto. In the thermally conductive part 50 in this modification example, a fiber direction is oriented along the directions (for example, the directions D and E) parallel to the surface, and the thermally conductive part 50 has an anisotropy in thermal conductivity. Specifically, in the thermally conductive part 50, the thermal conductivity thereof along the direction D and the direction E is higher than the thermal conductivity along the direction F. That is, in the thermally conductive part 50, heat is transmitted more easily along the direction D and the direction E than the direction F.

The thermally conductive part 50 is mounted such that the surface 52 on one side is in contact with the surface 25 of the amplification layer 24 and the surface on the other side is in contact with the cooling surface 35 of the cooling part 30. Further, the thermally conductive part 50 is mounted such that the direction D is a direction parallel to the direction X, the direction is a direction parallel to the direction 7, and the direction F is a direction parallel to the direction Y. However, the mounting direction of the thermally conductive part 50 is not limited thereto as long as the direction F is a direction parallel to the direction Y.

The solid laser amplification device 10d according to the modification example has the thermally conductive part 50 which is provided in contact with the amplification layer 24 and the cooling surface 35 between the amplification layer 24 and the cooling surface 35 and transfers the heat of the amplification layer 24 to the cooling part 30. The solid laser amplification device 10d transfers heat to the cooling part 30 through the thermally conductive part 50. Therefore, in the solid laser amplification device 10d, it is possible to efficiently transfer the heat of the amplification layer 24 to the cooling part 30, and thus at as possible to more properly cool the amplification layer 24.

Further, the thermally conductive part 50 in this modification example is the pitch type CFRP, and therefore, the thermally conductive part has high thermal conductivity and can more efficiently transfer the heat of the amplification layer 24 to the cooling part 30. Further, in the thermally conductive part 50, the thermal conductivity thereof along the directions (the directions D and E) parallel to the surface 52 on one side is higher than the thermal conductivity along the direction (the direction F) perpendicular to the surface 52 on one side. Therefore, in the solid laser amplification device 10d, it is possible to diffuse the heat of the amplification layer 24 in a surface direction of the thermally conductive part 50 and cool the heat on the entire cooling surface 35 of the cooling part 30. Therefore, the thermally conductive part 50 can more properly cool the amplification layer 24. Further, in the solid laser amplification device 10d, the heat of the amplification layer 24 is diffused in the surface direction of the thermally conductive part 50, and therefore, the heat of the amplification layer 24 is made uniform along the surface, so that it is also possible to suppress the bias of a temperature distribution in the laser medium part 20.

However, in the thermally conductive part 50, the thermal conductivity thereof along the direction (the direction F) perpendicular to the surface 52 on one side may be higher than the thermal conductivity along the directions (the directions D and E) parallel to the surface 52 on one side. In this case, the fiber direction of the CFRP is oriented along the direction (the direction F) perpendicular to the surface 52 on one side. The thermally conductive part 50 can rapidly transfer the heat in the direction E, that is, in the direction toward the cooling part 30 from the amplification layer 24, and therefore, it becomes possible to more rapidly cool the amplification layer 24.

Further, the material of the thermally conductive part 50 is not limited to the pitch type CFRP and may be, for example, a graphite sheet. The graphite sheet is a sheet which includes graphite. The graphite sheet is formed by laminating graphite layers extending along the directions D and E, along the direction F, whereby it is possible to make the thermal conductivity along the directions (the directions D and E) parallel to the surface 52 on one side higher than the thermal conductivity along the direction (the direction F) perpendicular to the surface 52 on one side. Further, the graphite sheet is formed by laminating graphite layers extending along the direction F, along the direction D or the direction E, whereby it is possible to make the thermal conductivity along the direction (the direction F) perpendicular to the surface 52 on one side higher than the thermal conductivity along the directions (the directions D and E) parallel to the surface 52 on one side.

The thermally conductive part 50 according to this modification example can be applied to any of the solid laser amplification devices of the first embodiment to the third embodiment.

The embodiments and the modification example of the present invention have been described above. However, embodiments are not limited by the contents of these embodiments. Further, the constituent elements described above, constituent elements which can be easily anticipated by those skilled in the art, constituent elements which are substantially equal to the constituent elements described above, and so-called equivalents are included. Further, it is possible to appropriately combine the constituent elements described above. Further, various omissions, substitutions, or changes of constituent elements can be made within a scope which does not depart from the gist of the embodiments described above.

REFERENCE SIGNS LIST 1, 1d: solid laser device
10, 10a, 10b, 10c: solid laser amplification device
12: accommodation chamber
13: entrance window
14: exit window
20 laser medium part
22: medium
24, 24A, 24B, 24C: amplification layer
25: surface
26: entrance part
27: exit part
30, 30A, 30E, 30C, 30a, 30b, 30c, 30X: cooling part
31, 31a, 31b, 31c: microchannel part
32, 32X: inlet header part
32a: first header part
32Aa, 32Ba, 32Ca, 32Da, 32Da: space
32H: introduction opening portion
34, 34X: outlet header part
34a: second header part
34Aa, 34Ba, 34Ca, 34Da, 34Ea: space
34H: lead-out opening portion
35: cooling surface
36, 36A, 36B, 36C, 36D, 36E: cooling pipeline
37, 38: side surface
41: inlet pipeline
42: first pipeline
43: second pipeline
44: outlet pipeline
50, 50A, 50B, 50C: thermally conductive part
52: surface
54: surface
60: cooling solvent cooling part
62: introduction pipe
64: lead-out pipe
100: light emitting part
102: irradiation part
A, B, C, D, E, F, X, Y, Z: direction
L: laser light
P: light receiving place
S1, S2: curve
W, W1, W2, W3, W4: cooling solvent

The invention claimed is:

1. A solid laser amplification device comprising:
a laser medium part which has a solid medium, into which a laser light enters from an entrance part and from which the laser light is emitted from an exit part to the outside, and an amplification layer which is provided on a surface of the medium, receives the laser light in the medium, and amplifies and reflects the laser light toward the exit part; and
a microchannel type cooling part which has a plurality of cooling pipelines, through which a cooling solvent passes and which are arranged in a direction parallel to a surface of the amplification layer, and a cooling surface which is provided at an outer periphery of the plurality of cooling pipelines and mounted on the surface of the amplification layer, and cools the amplification layer,
wherein in the cooling part, a cooling power increases as it goes toward the cooling pipeline provided at a position closer to a position facing a place receiving the laser light, of the amplification layer,
wherein each of the plurality of cooling pipelines has a first pipeline extending in a direction approaching the cooling surface, and a second pipeline which is connected to the first pipeline and extends in a direction away from the cooling surface, and through which the cooling solvent from the first pipeline flows.

2. The solid laser amplification device according to claim 1, wherein in the cooling part, flow velocity of the cooling solvent flowing therein increases as it goes toward the cooling pipeline provided at a position closer to a position facing a place receiving the laser light, of the amplification layer, or a temperature of the cooling solvent flowing-in decreases as it goes toward the cooling pipeline provided at a position closer to a position facing a place receiving the laser light, of the amplification layer.

3. The solid laser amplification device according to claim 1, wherein in the cooling part, a direction in which the cooling solvents flow in some of the cooling pipelines is set to be a direction opposite to a direction in which the cooling solvents flow in other cooling pipelines.

4. The solid laser amplification device according to claim 3, wherein in the cooling part, flow directions of the cooling solvents in the cooling pipelines adjacent to each other are set to be directions opposite to each other.

5. The solid laser amplification device according to claim 1, further comprising:
   a thermally conductive part which is provided in contact with the amplification layer and the cooling surface between the amplification layer and the cooling surface and transfers heat of the amplification layer to the cooling part.

6. A solid laser amplification device comprising:
   a laser medium part which has a solid medium, into which a laser light enters from an entrance part and from which the laser light is emitted from an exit part to the outside, and an amplification layer which is provided on a surface of the medium, receives the laser light in the medium, and amplifies and reflects the laser light toward the exit part; and
   a microchannel type cooling part which has a plurality of cooling pipelines, through which a cooling solvent passes and which are arranged in a direction parallel to a surface of the amplification layer, and a cooling surface which is provided at an outer periphery of the plurality of cooling pipelines and mounted on the surface of the amplification layer, and cools the amplification layer,
   wherein each of the plurality of cooling pipelines has a first pipeline extending in a direction approaching the cooling surface, and a second pipeline which is connected to the first pipeline and extends in a direction away from the cooling surface, and through which the cooling solvent from the first pipeline flows.

* * * * *